(12) United States Patent
Zhu

(10) Patent No.: US 8,283,025 B2
(45) Date of Patent: *Oct. 9, 2012

(54) REINFORCED SILICONE RESIN FILMS

(75) Inventor: Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 388 days.

This patent is subject to a terminal disclaimer.

(21) Appl. No.: 12/527,585

(22) PCT Filed: Jan. 31, 2008

(86) PCT No.: PCT/US2008/001315
§ 371 (c)(1),
(2), (4) Date: Aug. 18, 2009

(87) PCT Pub. No.: WO2008/103228
PCT Pub. Date: Aug. 28, 2008

(65) Prior Publication Data
US 2010/0086760 A1 Apr. 8, 2010

Related U.S. Application Data

(60) Provisional application No. 60/902,719, filed on Feb. 22, 2007.

(51) Int. Cl.
*B32B 7/02* (2006.01)
*B32B 27/06* (2006.01)
(52) U.S. Cl. ......... 428/216; 428/215; 428/323; 428/447
(58) Field of Classification Search .................. 428/215, 428/216, 323, 447
See application file for complete search history.

(56) References Cited

U.S. PATENT DOCUMENTS

| | | |
|---|---|---|
| 736,971 A | 8/1903 | Jenkins |
| 2,702,764 A | 2/1955 | Painter et al. |
| 2,915,475 A | 12/1959 | Bugosh |
| 3,031,417 A | 4/1962 | Wilkinson |
| 3,419,593 A | 12/1968 | Willing |
| 3,445,420 A | 5/1969 | Kookootsedes et. al. |
| 4,087,585 A | 5/1978 | Schulz |
| 4,260,780 A | 4/1981 | West |
| 4,273,697 A | 6/1981 | Sumimura et al. |
| 4,276,424 A | 6/1981 | Peterson, Jr. et al. |
| 4,314,956 A | 2/1982 | Baney et al. |
| 4,324,901 A | 4/1982 | West et al. |
| 4,332,525 A | 6/1982 | Cheney, Jr. |
| 4,395,443 A | 7/1983 | Shimizu et al. |
| 4,460,638 A | 7/1984 | Haluska |
| 4,460,639 A | 7/1984 | Chi et al. |
| 4,460,640 A | 7/1984 | Chi et al. |
| 4,500,447 A | 2/1985 | Kobayashi et al. |
| 4,510,094 A | 4/1985 | Drahnak et al. |
| 4,530,879 A | 7/1985 | Drahnak et al. |
| 4,537,829 A | 8/1985 | Blizzard et al. |
| 4,568,566 A | 2/1986 | Tolentino |
| 4,572,814 A | 2/1986 | Naylor et al. |
| 4,618,666 A | 10/1986 | Port |
| 4,761,454 A | 8/1988 | Oba et al. |
| 4,766,176 A | 8/1988 | Lee et al. |
| 4,898,689 A | 2/1990 | Hamada et al. |
| 4,916,169 A | 4/1990 | Boardman et al. |
| 4,952,658 A | 8/1990 | Kalchauer et al. |
| 5,017,654 A | 5/1991 | Togashi et al. |
| 5,135,980 A | 8/1992 | Watanabe |
| 5,166,287 A | 11/1992 | Kalchauer et al. |
| 5,194,649 A | 3/1993 | Okawa |
| 5,213,868 A | 5/1993 | Liberty et al. |
| 5,256,480 A | 10/1993 | Inoue et al. |
| 5,278,272 A | 1/1994 | Lai et al. |
| 5,281,455 A | 1/1994 | Braun et al. |
| 5,283,309 A | 2/1994 | Morita |
| 5,310,843 A | 5/1994 | Morita |
| 5,312,946 A | 5/1994 | Stank et al. |
| 5,319,051 A | 6/1994 | Tabei et al. |
| 5,358,983 A | 10/1994 | Morita |
| 5,371,139 A | 12/1994 | Yokoyama et al. |
| 5,468,826 A | 11/1995 | Gentle et al. |
| 5,468,827 A | 11/1995 | Morita |
| 5,474,608 A | 12/1995 | Beisswanger et al. |
| 5,486,588 A | 1/1996 | Morita |
| 5,496,961 A | 3/1996 | Dauth et al. |
| 5,527,578 A | 6/1996 | Mazuret et al. |
| 5,530,075 A | 6/1996 | Morita et al. |
| 5,580,915 A | 12/1996 | Lin |

(Continued)

FOREIGN PATENT DOCUMENTS

CN 1528000 A 9/2004

(Continued)

OTHER PUBLICATIONS

Guo, Andrew, et. al., "Highly Active Visible-Light Photocatalysts for Curing a Ceramic Precursor," Chemistry of Materials, 1998, pp. 531-536, vol. 10, American Chemical Society.
Frogley, Mark D. et. al., "Mechanical properties of carbon nanoparticle-reinforced elastomers", Composites Science and Technology, 2003, pp. 1647-1654, vol. 63, Elsevier Ltd.
Reese, Herschel, et. al., "Development of Silicone Substrates to be Used with CIGS Deposition," Air Force Office of Scientific Research, 2005, pp. 1-62, Arlington, Virginia.
English language abstract of JP 59-096122 extracted from espacenet. com database dated Aug. 26, 2011; 1 page.
English language abstract of FR 2564470 extracted from espacenet. com database dated Oct. 12, 2010; 2 pages.
English language abstract of JP 10-001549 extracted from espacenet. com database dated Aug. 26, 2011; 1 page.
English language abstract of DE 19647368 extracted from espacenet. com database dated Aug. 26, 2011; 1 page.
English language abstract of DE 19915378 extracted from espacenet. com database dated Aug. 26, 2011; 1 page.

(Continued)

*Primary Examiner* — D. S. Nakarani
(74) *Attorney, Agent, or Firm* — Howard & Howard Attorneys PLLC

(57) ABSTRACT

Reinforced silicone resin films comprising at least two polymer layers, wherein at least one of the polymer layers comprises a cured product of a at least one silicone resin having an average of at least two silicon-bonded alkenyl groups or silicon-bonded hydrogen atoms per molecule, and at least one of the polymer layers comprises a carbon nanomaterial.

16 Claims, No Drawings

U.S. PATENT DOCUMENTS

| | | | |
|---|---|---|---|
| 5,581,008 | A | 12/1996 | Kobayashi |
| 5,585,147 | A | 12/1996 | Ogawa et al. |
| 5,738,976 | A | 4/1998 | Okinoshima et al. |
| 5,794,649 | A | 8/1998 | Spear et al. |
| 5,801,262 | A | 9/1998 | Adams |
| 5,824,761 | A | 10/1998 | Bujanowski et al. |
| 5,830,950 | A | 11/1998 | Katsoulis et al. |
| 5,861,467 | A | 1/1999 | Bujanowski et al. |
| 5,904,796 | A | 5/1999 | Freuler et al. |
| 5,959,038 | A | 9/1999 | Furukawa et al. |
| 5,972,512 | A | 10/1999 | Boisvert et al. |
| 6,046,283 | A | 4/2000 | Katsoulis et al. |
| 6,194,063 | B1 | 2/2001 | Oura et al. |
| 6,204,301 | B1 | 3/2001 | Oshima et al. |
| 6,287,639 | B1 | 9/2001 | Schmidt et al. |
| 6,297,305 | B1 | 10/2001 | Nakata et al. |
| 6,310,146 | B1 | 10/2001 | Katsoulis et al. |
| 6,352,610 | B1 | 3/2002 | Schmidt et al. |
| 6,368,535 | B1 | 4/2002 | Katsoulis et al. |
| 6,376,078 | B1 | 4/2002 | Inokuchi |
| 6,378,599 | B1 | 4/2002 | Schmidt et al. |
| 6,387,487 | B1 | 5/2002 | Greenberg et al. |
| 6,407,922 | B1 | 6/2002 | Eckland et al. |
| 6,432,497 | B2 | 8/2002 | Bunyan |
| 6,451,869 | B1 | 9/2002 | Butts |
| 6,617,674 | B2 | 9/2003 | Becker et al. |
| 6,644,395 | B1 | 11/2003 | Bergin |
| 6,652,958 | B2 | 11/2003 | Tobita |
| 6,656,425 | B1 | 12/2003 | Benthien et al. |
| 6,660,395 | B2 | 12/2003 | McGarry et al. |
| 6,689,859 | B2 | 2/2004 | Li et al. |
| 6,730,731 | B2 | 5/2004 | Tobita et al. |
| 6,783,692 | B2 | 8/2004 | Bhagwagar |
| 6,791,839 | B2 | 9/2004 | Bhagwagar |
| 6,831,145 | B2 | 12/2004 | Kleyer et al. |
| 6,838,005 | B2 | 1/2005 | Tepper |
| 6,841,213 | B2 | 1/2005 | Parsonage et al. |
| 6,884,314 | B2 | 4/2005 | Cross et al. |
| 6,902,688 | B2 | 6/2005 | Narayan et al. |
| 6,908,682 | B2 | 6/2005 | Mistele |
| 7,029,603 | B2 | 4/2006 | Wang et al. |
| 7,037,592 | B2 | 5/2006 | Zhu et al. |
| 7,074,481 | B2 | 7/2006 | Watson |
| 7,132,062 | B1 | 11/2006 | Howard |
| 7,147,367 | B2 | 12/2006 | Balian et al. |
| 7,163,720 | B1 | 1/2007 | Dhaler et al. |
| 7,253,442 | B2 | 8/2007 | Huang et al. |
| 7,311,967 | B2 | 12/2007 | Dani et al. |
| 7,339,012 | B2 | 3/2008 | Prasse |
| 7,381,470 | B2 | 6/2008 | Suto et al. |
| 7,459,192 | B2 | 12/2008 | Parsonage et al. |
| 7,563,515 | B2 | 7/2009 | Ekeland et al. |
| 7,622,159 | B2 | 11/2009 | Mertz et al. |
| 7,658,983 | B2 | 2/2010 | Mormont et al. |
| 7,799,842 | B2 | 9/2010 | Anderson et al. |
| 7,850,870 | B2 | 12/2010 | Ahn et al. |
| 2003/0047718 | A1 | 3/2003 | Narayan et al. |
| 2003/0054162 | A1 | 3/2003 | Watson |
| 2003/0077478 | A1 | 4/2003 | Dani et al. |
| 2003/0096104 | A1 | 5/2003 | Tobita et al. |
| 2003/0170418 | A1 | 9/2003 | Mormont et al. |
| 2003/0175533 | A1 | 9/2003 | McGarry et al. |
| 2003/0213939 | A1 | 11/2003 | Narayan et al. |
| 2004/0053059 | A1 | 3/2004 | Mistele |
| 2004/0089851 | A1 | 5/2004 | Wang et al. |
| 2004/0101679 | A1 | 5/2004 | Mertz et al. |
| 2004/0126526 | A1 | 7/2004 | Parsonage et al. |
| 2004/0166332 | A1 | 8/2004 | Zhu et al. |
| 2005/0059754 | A1 | 3/2005 | Lunt et al. |
| 2005/0113749 | A1 | 5/2005 | Parsonage et al. |
| 2005/0227091 | A1 | 10/2005 | Suto et al. |
| 2005/0281997 | A1 | 12/2005 | Grah |
| 2007/0020468 | A1 | 1/2007 | Ekeland et al. |
| 2007/0120100 | A1 | 5/2007 | Glatkowski et al. |
| 2007/0246245 | A1 | 10/2007 | Ahn et al. |
| 2008/0051548 | A1 | 2/2008 | Bailey et al. |
| 2008/0115827 | A1 | 5/2008 | Woods et al. |
| 2008/0138525 | A1 | 6/2008 | Bailey et al. |
| 2009/0005499 | A1 | 1/2009 | Fisher et al. |
| 2009/0090413 | A1 | 4/2009 | Katsoulis et al. |
| 2009/0105362 | A1 | 4/2009 | Anderson et al. |
| 2009/0155577 | A1 | 6/2009 | Anderson et al. |
| 2009/0246499 | A1 | 10/2009 | Katsoulis et al. |
| 2010/0028643 | A1 | 2/2010 | Zhu |
| 2010/0062247 | A1 | 3/2010 | Fisher et al. |
| 2010/0068538 | A1 | 3/2010 | Fisher |
| 2010/0075127 | A1 | 3/2010 | Fisher et al. |
| 2010/0086760 | A1 | 4/2010 | Zhu |
| 2010/0087581 | A1 | 4/2010 | Fisher et al. |
| 2010/0112321 | A1 | 5/2010 | Zhu |
| 2010/0129625 | A1 | 5/2010 | Zhu |
| 2010/0143686 | A1 | 6/2010 | Zhu |
| 2010/0209687 | A1 | 8/2010 | Zhu |
| 2010/0233379 | A1 | 9/2010 | Fisher et al. |
| 2010/0280172 | A1 | 11/2010 | Zhu |

FOREIGN PATENT DOCUMENTS

| | | | |
|---|---|---|---|
| CN | 1558931 A | | 12/2004 |
| CN | 1676568 A | | 10/2005 |
| DE | 19647368 | | 5/1998 |
| DE | 19915378 A1 | | 10/2000 |
| DE | 4033157 | | 9/2003 |
| EP | 0126535 A1 | | 11/1984 |
| EP | 0358452 A2 | | 3/1990 |
| EP | 0480680 A1 | | 4/1992 |
| EP | 0566311 A2 | | 10/1993 |
| EP | 0562922 B1 | | 5/1997 |
| EP | 0850998 A2 | | 7/1998 |
| EP | 0936250 A2 | | 8/1999 |
| EP | 1050538 A2 | | 11/2000 |
| EP | 1065248 A2 | | 1/2001 |
| EP | 1454962 A1 | | 9/2004 |
| EP | 1391492 B1 | | 6/2006 |
| FR | 2564470 A1 | | 11/1985 |
| GB | 736971 | | 9/1955 |
| JP | 47-27300 A | | 10/1972 |
| JP | 53-118470 A | | 10/1978 |
| JP | 59-025742 A | | 2/1984 |
| JP | 59-096122 | | 6/1984 |
| JP | 59-199547 A | | 11/1984 |
| JP | 62-003947 | | 1/1987 |
| JP | 02-058587 A | | 2/1990 |
| JP | 08-027381 A | | 1/1996 |
| JP | 08-037418 A | | 2/1996 |
| JP | 09-064391 A | | 3/1997 |
| JP | 10-001549 | | 1/1998 |
| JP | 10-212410 A | | 8/1998 |
| JP | 2000-119526 A | | 4/2000 |
| JP | 2000-195337 A | | 7/2000 |
| JP | 2001-291431 A | | 10/2001 |
| JP | 2004-002653 A | | 1/2004 |
| JP | 2004-339427 A | | 12/2004 |
| JP | 2005-520020 A | | 7/2005 |
| JP | 2007-90817 A | | 4/2007 |
| JP | 2008-530339 A | | 8/2008 |
| TW | 2004/18964 A | | 10/2004 |
| WO | WO 94/17003 | | 8/1994 |
| WO | 02/082468 A1 | | 10/2002 |
| WO | 02/085612 A2 | | 10/2002 |
| WO | 03/078079 A1 | | 9/2003 |
| WO | 03/099828 A1 | | 12/2003 |
| WO | 03104329 A1 | | 12/2003 |
| WO | 2004/035661 A1 | | 4/2004 |
| WO | 2004/060472 A1 | | 7/2004 |
| WO | 2004076175 A1 | | 9/2004 |
| WO | WO 2004/106420 A2 | | 12/2004 |
| WO | WO 2005/114324 A2 | | 12/2005 |
| WO | WO 2006/088645 A1 | | 8/2006 |
| WO | WO 2006/088646 A1 | | 8/2006 |
| WO | 2007/013135 A1 | | 2/2007 |
| WO | WO 2007/018756 A1 | | 2/2007 |
| WO | WO 2007/092118 A2 | | 8/2007 |
| WO | WO 2007/097835 A2 | | 8/2007 |
| WO | 2007/121006 A2 | | 10/2007 |
| WO | 2007/123901 A1 | | 11/2007 |
| WO | 2008/013611 A1 | | 1/2008 |
| WO | 2008/013612 A1 | | 1/2008 |

| WO | 2008/045104 A2 | 4/2008 |
| WO | 2008/051242 A2 | 5/2008 |
| WO | 2009/007786 A2 | 1/2009 |

OTHER PUBLICATIONS

English language abstract of DE 4033157 extracted from espacenet.com database dated Aug. 26, 2011; 1 page.
English language abstract of CN 1528000 extracted from espacenet.com database dated Sep. 23, 2010; 1 page.
English language abstract of TW 2004/18964 dated Sep. 23, 2010; 3 pages.
English language translation and abstract for JP 2004-339427 extracted from PAJ database, dated Oct. 15, 2010, 51 pages.
English language abstract of CN 1558931 extracted from espacenet.com database dated Aug. 26, 2011; 1 page.
English language abstract of CN 1676568 extracted from espacenet.com database dated Mar. 1, 2011; 1 page.
Zhu, H.Y., "Novel synthesis of aluminum oxide nanofibers," Materials Research Society Symposium Proceedings, vol. 703, held Nov. 26-29, 2001, Nanophase and Nanocomposite Materials IV. Symposium, published 2002, pp. 25-30, Materials Research Society, Warrendale, Pennsylvania, USA.
Partial English Translation for JP62-003947, dated Nov. 15, 2011, 2 pages.
English language abstract of JP 02-058587 extracted from espacenet.com database dated Nov. 15, 2011; 1 page.
English language abstract of JP 2000-119526 extracted from espacenet.com database dated Nov. 15, 2011; 1 page.
English language abstract of JP 53-118470 extracted from espacenet.com database dated Nov. 15, 2011; 1 page.
English language abstract of JP 2000-195337 extracted from espacenet.com database dated Nov. 14, 2011; 1 page.
English Language abstract of JP 2004-002653 extracted from espacenet.com database dated Nov. 14, 2011; 1 page.
English Language abstract of JP 2001-291431 extracted from espacenet.com database dated Nov. 14, 2011; 1 page.
English Language abstract of JP 9-64391 extracted from espacenet.com database dated Nov. 14, 2011; 1 page.
English Language abstract of JP 8-37418 extracted from espacenet.com database dated Nov. 14, 2011; 1 page.
English Language abstract of JP 8-27381 extracted from espacenet.com database dated Nov. 14, 2011; 1 page.

REINFORCED SILICONE RESIN FILMS

CROSS REFERENCE TO RELATED APPLICATIONS

This application is a U.S. national stage filing under 35 U.S.C. §371 of PCT Application No. PCT/US08/01315 filed on 31 Jan. 2008, currently pending, which claims the benefit of U.S. Provisional Patent Application No. 60/902,719 filed 22 Feb. 2007 under 35 U.S.C. §119 (e). PCT Application No. PCT/US08/01315 and U.S. Provisional Patent Application No. 60/902,719 are hereby incorporated by reference.

FIELD OF THE INVENTION

The present invention relates to reinforced silicone resin films and more particularly to reinforced silicone resin films comprising at least two polymer layers, wherein at least one of the polymer layers comprises a cured product of a at least one silicone resin having an average of at least two silicon-bonded alkenyl groups or silicon-bonded hydrogen atoms per molecule, and at least one of the polymer layers comprises a carbon nanomaterial.

BACKGROUND OF THE INVENTION

Silicone resins are useful in a variety of applications by virtue of their unique combination of properties, including high thermal stability, good moisture resistance, excellent flexibility, high oxygen resistance, low dielectric constant, and high transparency. For example, silicone resins are widely used as protective or dielectric coatings in the automotive, electronic, construction, appliance, and aerospace industries.

Although silicone resin coatings can be used to protect, insulate, or bond a variety of substrates, free standing silicone resin films have limited utility due to low tear strength, high brittleness, low glass transition temperature, and high coefficient of thermal expansion. Consequently, there is a need for free standing silicone resin films having improved mechanical and thermal properties.

SUMMARY OF THE INVENTION

The present invention is directed to a reinforced silicone resin film consisting essentially of:
a first polymer layer; and
a second polymer layer on the first polymer layer; wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, and (iii) a mixture comprising (i) and (ii).

The present invention is also directed to a reinforced silicone resin film comprising:
a first polymer layer;
a second polymer layer on the first polymer layer; and
at least one additional polymer layer on the second polymer layer; wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial.

The reinforced silicone resin films of the present invention have low coefficient of thermal expansion, and exhibit high resistance to thermally induced cracking.

The reinforced silicone resin films of the present invention are useful in applications requiring films having high thermal stability, flexibility, mechanical strength, and transparency. For example, the silicone resin films can be used as integral components of flexible displays, solar cells, flexible electronic boards, touch screens, fire-resistant wallpaper, and impact-resistant windows. The films are also suitable substrates for transparent or nontransparent electrodes.

DETAILED DESCRIPTION OF THE INVENTION

As used herein, the term "free of aliphatic unsaturation" means the hydrocarbyl or halogen-substituted hydrocarbyl group does not contain an aliphatic carbon-carbon double bond or carbon-carbon triple bond. Also, the term "mol % of the groups $R^2$ in the silicone resin are alkenyl" is defined as the ratio of the number of moles of silicon-bonded alkenyl groups in the silicone resin to the total number of moles of the groups $R^2$ in the resin, multiplied by 100. Further, the term "mol % of the groups $R^4$ in the organohydrogenpolysiloxane resin are organosilylalkyl" is defined as the ratio of the number of moles of silicon-bonded organosilylalkyl groups in the organohydrogenpolysiloxane resin to the total number of moles of the groups $R^4$ in the resin, multiplied by 100. Still further, the term "mol % of the groups $R^5$ in the silicone resin are hydrogen" is defined as the ratio of the number of moles of silicon-bonded hydrogen atoms in the silicone resin to the total number of moles of the groups $R^5$ in the resin, multiplied by 100.

A first reinforced silicone resin film according to the present invention consists essentially of:
a first polymer layer; and
a second polymer layer on the first polymer layer; wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, and (iii) a mixture comprising (i) and (ii).

The first polymer layer of the first reinforced silicone resin film typically has a thickness of from 0.01 to 1000 µm, alternatively from 5 to 500 µm, alternatively from 10 to 100 µm.

The first polymer layer of the first reinforced silicone resin film can comprise a thermoplastic polymer or a thermoset polymer. The thermoplastic or thermoset polymer can be a homopolymer or a copolymer. Moreover, the thermoplastic or thermoset polymer can be a silicone polymer or an organic polymer. As used herein and below, the term "thermoplastic polymer" refers to a polymer that has the property of converting to a fluid (flowable) state when heated and of becoming rigid (nonflowable) when cooled. Also, the term "thermoset polymer" refers to a cured (i.e., cross-linked) polymer that does not convert to a fluid state on heating.

Examples of thermoplastic polymers include, but are not limited to thermoplastic silicone polymers such as poly(diphenylsiloxane-co-phenylmethylsiloxane); and thermoplastic organic polymers such as polyolefins, polysulfones, polyacrylates and polyetherimides.

Examples of thermoset polymers include, but are not limited to, thermoset silicone polymers such as cured silicone elastomers, silicone gels, and cured silicone resins; and thermoset organic polymers such as cured epoxy resins, cured amino resins, cured polyurethanes, cured polyimides, cured phenolic resins, cured cyanate ester resins, cured bismaleimide resins, cured polyesters, and cured acrylic resins.

In addition to a thermoplastic or thermoset polymer, the first polymer layer of the first reinforced silicone resin film can comprise a reinforcement selected from a carbon nanomaterial, a fiber reinforcement, or a mixture thereof.

The second polymer layer of the first reinforced silicone resin film is as described and exemplified above for the first polymer layer. The first and second polymer layers of the first reinforced silicone resin film differ in at least one of numerous physical and chemical properties, including thickness, polymer composition, cross-link density, and concentration of carbon nanomaterial or other reinforcement.

At least one of the polymer layers of the first reinforced silicone resin film comprises a cured product of at least one silicone resin having an average of at least two silicon-bonded alkenyl groups or silicon-bonded hydrogen atoms per molecule. As used herein, the term "cured product of at least one silicone resin" refers to a cross-linked product of at least one silicone resin, the product having a three-dimensional network structure. The silicone resin, methods of preparing the resin, and methods of preparing the cured product of the silicone resin are described below in the method of preparing the first reinforced silicone resin film of the present invention.

At least one of the polymer layers of the first reinforced silicone resin film comprises a carbon nanomaterial. The carbon nanomaterial can be any carbon material having at least one physical dimension (e.g., particle diameter, fiber diameter, layer thickness) less than about 200 nm. Examples of carbon nanomaterials include, but are not limited to, carbon nanoparticles having three dimensions less than about 200 nm, such as quantum dots, hollow spheres, and fullerenes; fibrous carbon nanomaterials having two dimensions less than about 200 nm, such as nanotubes (e.g., single-walled nanotubes and multi-walled nanotubes) and nanofibers (e.g., axially aligned, platelet, and herringbone or fishbone nanofibers); and layered carbon nanomaterials having one dimension less than about 200 nm, such as carbon nanoplatelets (e.g., exfoliated graphite and graphene sheet). The carbon nanomaterial can be electrically conductive or semiconductive.

The carbon nanomaterial can also be an oxidized carbon nanomaterial, prepared by treating the aforementioned carbon nanomaterials with an oxidizing acid or mixture of acids at elevated temperature. For example, the carbon nanomaterial can be oxidized by heating the material in a mixture of concentrated nitric and concentrated sulfuric acid (1:3 v/v, 25 mL/g carbon) at a temperature of from 40 to 150° C. for 1-3 hours.

The carbon nanomaterial can be a single carbon nanomaterial or a mixture comprising at least two different carbon nanomaterials, each as described above.

The concentration of the carbon nanomaterial in the first and/or second polymer layer is typically from 0.0001 to 99% (w/w), alternatively from 0.001 to 50% (w/w), alternatively from 0.01 to 25% (w/w), alternatively from 0.1 to 10% (w/w), alternatively from 1 to 5% (w/w), based on the total weight of the polymer layer.

Methods of preparing carbon nanomaterials are well-known in the art. For example, carbon nanoparticles (e.g., fullerenes) and fibrous carbon nanomaterials (e.g., nanotubes, and nanofibers) can be prepared using at least one of the following methods: arc discharge, laser ablation, and catalytic chemical vapor deposition. In the arc discharge process, an arc discharge between two graphite rods produces, depending on the gas atmosphere, single-walled nanotubes, multi-walled nanotubes, and fullerenes. In the laser ablation method, a graphite target loaded with a metal catalyst is irradiated with a laser in a tube furnace to produce single- and multi-walled nanotubes. In the catalytic chemical vapor deposition method, a carbon-containing gas or gas mixture is introduced into a tube furnace containing a metal catalyst at a temperature of from 500 to 1000° C. (and different pressures) to produce carbon nanotubes and nanofibers. Carbon nanoplatelets can be prepared by the intercalation and exfoliation of graphite.

When both of the polymer layers of the first reinforced silicone resin film comprise a cured product of a silicone resin, then both of the polymer layers comprise a reinforcement selected from (i) a carbon nanomaterial, (ii) a fiber reinforcement, and (iii) a mixture comprising (i) and (ii). The carbon nanomaterial is as described and exemplified above. The polymer layers may each comprise the same or different reinforcement selected from (i), (ii), and (iii).

The fiber reinforcement can be any reinforcement comprising fibers, provided the reinforcement has a high modulus and high tensile strength. The fiber reinforcement typically has a Young's modulus at 25° C. of at least 3 GPa. For example, the reinforcement typically has a Young's modulus at 25° C. of from 3 to 1,000 GPa, alternatively from 3 to 200 GPa, alternatively from 10 to 100 GPa. Moreover, the reinforcement typically has a tensile strength at 25° C. of at least 50 MPa. For example, the reinforcement typically has a tensile strength at 25° C. of from 50 to 10,000 MPa, alternatively from 50 to 1,000 MPa, alternatively from 50 to 500 MPa.

The fiber reinforcement can be a woven fabric, e.g., a cloth; a nonwoven fabric, e.g., a mat or roving; or loose (individual) fibers. The fibers in the reinforcement are typically cylindrical in shape and have a diameter of from 1 to 100 µm, alternatively from 1 to 20 µm, alternatively form 1 to 10 µm. Loose fibers may be continuous, meaning the fibers extend throughout the reinforced silicone resin film in a generally unbroken manner, or chopped.

The fiber reinforcement is typically heat-treated prior to use to remove organic contaminants. For example, the fiber reinforcement is typically heated in air at an elevated temperature, for example, 575° C., for a suitable period of time, for example 2 h.

Examples of fiber reinforcements include, but are not limited to reinforcements comprising glass fibers; quartz fibers; graphite fibers; nylon fibers; polyester fibers; aramid fibers, such as Kevlar® and Nomex®; polyethylene fibers; polypropylene fibers; and silicon carbide fibers.

The concentration of the fiber reinforcement in the first and/or second polymer layer is typically from 0.1 to 95% (w/w), alternatively from 5 to 75% (w/w), alternatively from 10 to 40% (w/w), based on the total weight of the polymer layer.

When one or both of the polymer layers of the first reinforced silicone resin film comprise a mixture of a carbon nanomaterial and a fiber reinforcement, the concentration of the mixture is typically from 0.1 to 96% (w/w), alternatively from 5 to 75% (w/w), alternatively from 10 to 40% (w/w), based on the total weight of the polymer layer.

The first polymer layer and the second polymer layer can be prepared as described below in the method of preparing the first reinforced silicone resin film of the present invention.

The first reinforced silicone resin film can be prepared by a method comprising:

forming a first polymer layer on a release liner; and forming a second polymer layer on the first polymer layer;

wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, and (iii) a mixture comprising (i) and (ii).

In the first step of the method of preparing the first reinforced silicone resin film, a first polymer layer, described above, is formed on a release liner.

The release liner can be any rigid or flexible material having a surface from which the first polymer layer can be removed without damage. Examples of release liners include, but are not limited to, silicon, quartz; fused quartz; aluminum oxide; ceramics; glass; metal foils; polyolefins such as polyethylene, polypropylene, polystyrene, and polyethyleneterephthalate; fluorocarbon polymers such as polytetrafluoroethylene and polyvinylfluoride; polyamides such as Nylon; polyimides; polyesters such as poly(methyl methacrylate); epoxy resins; polyethers; polycarbonates; polysulfones; and polyether sulfones. The release liner can also be a material, as exemplified above, having a surface treated with a release agent, such as a silicone release agent.

The first polymer layer can be formed using a variety of methods, depending on the composition of the polymer layer. For example, when the first polymer layer comprises a thermoplastic polymer, the layer can by formed by (i) coating a release liner with a composition comprising a thermoplastic polymer in a fluid state and (ii) converting the thermoplastic polymer of the coated release liner to a solid state.

In step (i) of the preceding method of forming the first polymer layer, a release liner, described above, is coated with a composition comprising a thermoplastic polymer in fluid state.

The composition comprising a thermoplastic polymer can be any composition comprising a thermoplastic polymer in a fluid (i.e., liquid) state. As used herein, the term "thermoplastic polymer in a fluid state" means the polymer is in a molten state or dissolved in an organic solvent. For example, the composition can comprise a thermoplastic polymer in a molten state above the melting point ($T_m$) or glass transition temperature ($T_g$) of the polymer, or the composition can comprise a thermoplastic polymer and an organic solvent.

The thermoplastic polymer of the composition is as described and exemplified above for the first reinforced silicone resin film. The thermoplastic polymer can be a single thermoplastic polymer or a mixture (i.e., blend) comprising two or more different thermoplastic polymers. For example, the thermoplastic polymer can be a polyolefin blend.

The organic solvent can be any protic, aprotic, or dipolar aprotic organic solvent that does not react with the thermoplastic polymer and is miscible with the polymer. Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; halogenated aromatic hydrocarbons such as bromobenzene and chlorobenzene; and alcohols such as methanol, ethanol, 1-propanol, 2-propanol, 1-butanol, 2-butanol, 2-methyl-1-butanol, 1,1-dimethyl-1-ethanol, pentanol, hexanol, cyclohexanol, heptanol, and octanol.

The organic solvent can be a single organic solvent or a mixture comprising two or more different organic solvents, each as described and exemplified above.

The composition comprising the thermoplastic polymer can further comprise a carbon nanomaterial, described and exemplified above.

The release liner can be coated with the composition comprising a thermoplastic polymer in a fluid state using conventional coating techniques, such as spin coating, dipping, spraying, brushing, extrusion, or screen-printing. The amount of the composition is sufficient to form a first polymer layer having a thickness of from 0.01 to 1000 μm.

In step (ii) of the preceding method, the thermoplastic polymer of the coated release liner is converted to a solid state. When the composition used to coat the release liner comprises a thermoplastic polymer in a molten state, the thermoplastic polymer can be converted to a solid state by allowing the polymer to cool to a temperature below the liquid-solid transition temperature ($T_g$ or $T_m$), for example, room temperature. When the composition used to coat the release liner comprises a thermoplastic polymer and an organic solvent, the thermoplastic polymer can be converted to a solid state by removing at least a portion of the solvent. The organic solvent can be removed by allowing the solvent to evaporate at ambient temperature or by heating the coating to a moderate temperature, for example, below the solid-liquid transition temperature of the polymer.

The method of forming the first polymer layer, wherein the layer comprises a thermoplastic polymer, can further comprise, after step (i) and before step (ii), applying a second release liner to the coated release liner of the first step to form an assembly, and compressing the assembly. The assembly can be compressed to remove excess composition and/or entrapped air, and to reduce the thickness of the coating. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature (~23±2° C.) to 200° C.

The method of forming the first polymer layer, wherein the layer comprises a thermoplastic polymer, can further comprise repeating the steps (i) and (ii) to increase the thickness of the polymer layer, provided the same composition is used for each coating step.

When the first polymer layer comprises a thermoset (i.e., cross-linked) polymer, the layer can be formed by (i) coating a release liner with a curable composition comprising a thermosetting polymer and (ii) curing the thermosetting polymer of the coated release liner.

In step (i) of the immediately preceding method of forming the first polymer layer, a release liner, described above, is coated with a curable composition comprising a thermosetting polymer.

The curable composition comprising a thermosetting polymer can be any curable composition containing a thermosetting polymer. As used herein and below, the term "thermosetting polymer" refers to a polymer having the property of becoming permanently rigid (nonflowable) when cured (i.e., cross-linked). The curable composition typically contains a thermosetting polymer and additional ingredients, such as an organic solvent, cross-linking agent, and/or catalyst.

Examples of curable compositions comprising thermosetting polymers include, but are not limited to, curable silicone compositions, such as hydrosilylation-curable silicone compositions, condensation-curable silicone compositions, and peroxide-curable silicone compositions; curable polyolefin compositions such as polyethylene and polypropylene compositions; curable polyamide compositions; curable epoxy resin compositions; curable amino resin compositions; curable polyurethane compositions; curable polyimide compositions; curable polyester compositions; and curable acrylic resin compositions.

The curable composition comprising a thermosetting polymer can also be a hydrosilylation-curable silicone composition comprising a silicone resin having an average of at least two silicon-bonded alkenyl groups or silicon-bonded hydrogen atoms per molecule.

The hydrosilylation-curable silicone composition can be any hydrosilylation-curable silicone composition containing a silicone resin having an average of at least two silicon-bonded alkenyl groups or silicon-bonded hydrogen atoms per molecule. Typically, the hydrosilylation-curable silicone composition comprises the aforementioned silicone resin; an organosilicon compound in an amount sufficient to cure the silicone resin, wherein the organosilicon compound has an average of at least two silicon-bonded hydrogen atoms or silicon-bonded alkenyl groups per molecule capable of reacting with the silicon-bonded alkenyl groups or silicon-bonded hydrogen atoms in the silicone resin; and a catalytic amount of a hydrosilylation catalyst.

The silicone resin of the hydrosilylation-curable silicone composition is typically a copolymer containing T units, T and Q units, or T and/or Q siloxane units in combination with M and/or D siloxane units. Moreover, the silicone resin can be a rubber-modified silicone resin, described below for the fifth and sixth embodiments of the hydrosilylation-curable silicone composition.

According to a first embodiment, the hydrosilylation-curable silicone composition comprises (A) a silicone resin having the formula $(R^1R^2_2SiO_{1/2})_w(R^2_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has average of at least two silicon-bonded alkenyl groups per molecule; (B) an organosilicon compound having an average of at least two silicon-bonded hydrogen atoms per molecule in an amount sufficient to cure the silicone resin; and (C) a catalytic amount of a hydrosilylation catalyst.

Component (A) is at least one silicone resin having the formula $(R^1R^2_2SiO_{1/2})_w(R^2_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.95, x is from 0 to 0.95, y is from 0 to 1, z is from 0 to 0.95, w+x+y+z=1, y+z is from 0.05 to 1, and w+x is from 0 to 0.95, provided when y is 0, w+x is from 0.05 to 0.8, provided the silicone resin has an average of at least two silicon-bonded alkenyl groups per molecule.

The hydrocarbyl and halogen-substituted hydrocarbyl groups represented by $R^1$ are free of aliphatic unsaturation and typically have from 1 to 10 carbon atoms, alternatively from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different, typically have from 2 to about 10 carbon atoms, alternatively from 2 to 6 carbon atoms, and are exemplified by, but not limited to, vinyl, allyl, butenyl, hexenyl, and octenyl.

In the formula (I) of the silicone resin, the subscripts w, x, y, and z are mole fractions. The subscript w typically has a value of from 0 to 0.95, alternatively from 0.02 to 0.75, alternatively from 0.05 to 0.3; the subscript x typically has a value of from 0 to 0.95, alternatively from 0 to 0.7, alternatively from 0 to 0.25; the subscript y typically has a value of from 0 to 1, alternatively from 0.25 to 0.8, alternatively from 0.5 to 0.8; the subscript z typically has a value of from 0 to 0.95, alternatively from 0 to 0.7, alternatively from 0 to 0.15. Also, the sum y+z is typically from 0.05 to 1, alternatively from 0.5 to 0.95, alternatively from 0.65 to 0.9. Further, the sum w+x is typically from 0 to 0.95, alternatively from 0.05 to 0.5, alternatively from 0.1 to 0.35.

Typically at least 50 mol %, alternatively at least 65 mol %, alternatively at least 80 mol % of the groups $R^2$ in the silicone resin are alkenyl.

The silicone resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

The silicone resin typically contains less than 10% (w/w), alternatively less than 5% (w/w), alternatively less than 2% (w/w), of silicon-bonded hydroxy groups, as determined by $^{29}Si$ NMR.

The silicone resin contains $R^2SiO_{3/2}$ units (i.e., T units), $R^2SiO_{3/2}$ units (i.e., T units) and $SiO_{4/2}$ units (i.e., Q units), or $R^2SiO_{3/2}$ units (i.e., T units) and/or $SiO_{4/2}$ units (i.e., Q units) in combination with $R^1R^2_2SiO_{1/2}$ units (i.e., M units) and/or $R^2_2SiO_{2/2}$ units (i.e., D units), where $R^1$ and $R^2$ are as described and exemplified above. For example, the silicone resin can be a T resin, a TQ resin, a DT resin, an MT resin, an MDT resin, an MQ resin, a DQ resin, an MDQ resin, an MTQ resin, a DTQ resin, or an MDTQ resin.

Examples of silicone resins include, but are not limited to, resins having the following formulae:
$(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.15}(PhSiO_{3/2})_{0.75}(SiO_{4/2})_{0.1}$, and $(Vi_2MeSiO_{1/2})_{0.15}(ViMe_2SiO_{1/2})_{0.1}(PhSiO_{3/2})_{0.75}$, where Me is methyl, Vi is vinyl, Ph is phenyl, and the numerical subscripts outside the parenthesis denote mole fractions. Also, in the preceding formulae, the sequence of units is unspecified.

Component (A) can be a single silicone resin or a mixture comprising two or more different silicone resins, each as described above.

Methods of preparing silicone resins are well known in the art; many of these resins are commercially available. Silicone resins are typically prepared by cohydrolyzing the appropriate mixture of chlorosilane precursors in an organic solvent, such as toluene. For example, a silicone resin consisting essentially of $R^1R^2{}_2SiO_{1/2}$ units and $R^2SiO_{3/2}$ units can be prepared by cohydrolyzing a compound having the formula $R^1R^2{}_2SiCl$ and a compound having the formula $R^2SiCl_3$ in toluene, where $R^1$ and $R^2$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

Component (B) is at least one organosilicon compound having an average of at least two silicon-bonded hydrogen atoms per molecule in an amount sufficient to cure the silicone resin of component (A).

The organosilicon compound has an average of at least two silicon-bonded hydrogen atoms per molecule, alternatively at least three silicon-bonded hydrogen atoms per molecule. It is generally understood that cross-linking occurs when the sum of the average number of alkenyl groups per molecule in component (A) and the average number of silicon-bonded hydrogen atoms per molecule in component (B) is greater than four.

The organosilicon compound can be an organohydrogensilane or an organohydrogensiloxane. The organohydrogensilane can be a monosilane, disilane, trisilane, or polysilane. Similarly, the organohydrogensiloxane can be a disiloxane, trisiloxane, or polysiloxane. The structure of the organosilicon compound can be linear, branched, cyclic, or resinous. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris (dimethylsilyl)benzene, 1,3,5-trimethyl-1,3,5-trisilane, poly (methylsilylene)phenylene, and poly(methylsilylene) methylene.

The organohydrogensilane can also have the formula $HR^1{}_2Si$—$R^3$—$SiR^1{}_2H$, wherein $R^1$ is $C_1$ to $C_{10}$ hydrocarbyl or $C_1$ to $C_{10}$ halogen-substituted hydrocarbyl, both free of aliphatic unsaturation, and $R^3$ is a hydrocarbylene group free of aliphatic unsaturation having a formula selected from:

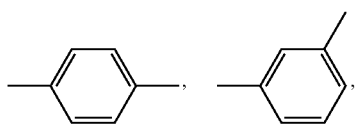

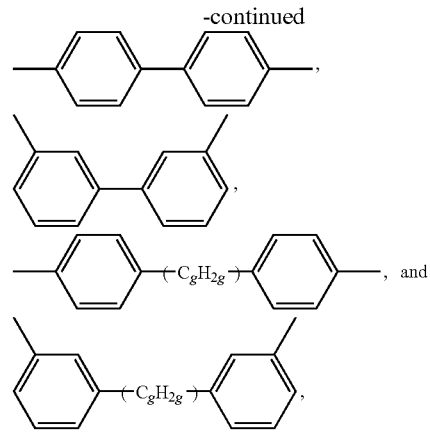

wherein g is from 1 to 6. The hydrocarbyl and halogen-substituted hydrocarbyl groups represented by $R^1$ are as defined and exemplified above for the silicone resin of component (A).

Examples of organohydrogensilanes having the formula $HR^1{}_2Si$—$R^3$—$SiR^1{}_2H$, wherein $R^1$ and $R^3$ are as described and exemplified above include, but are not limited to, silanes having the following formulae:

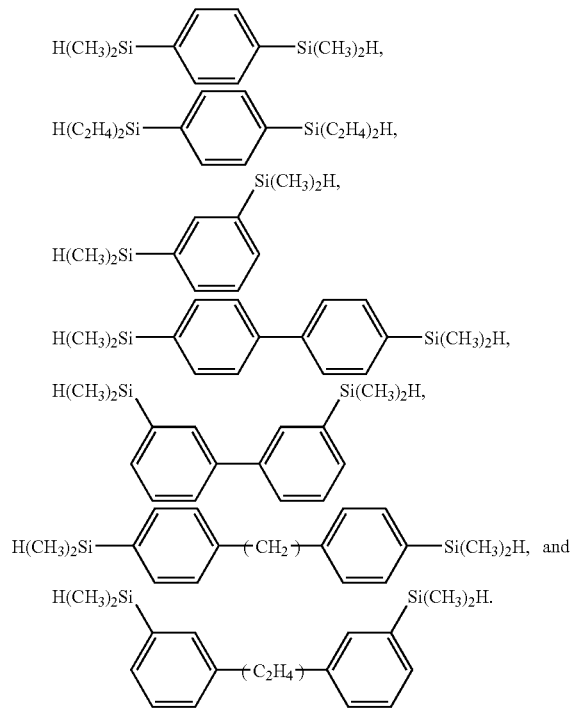

Examples of organohydrogensiloxanes include, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly (dimethylsiloxane/methylhydrogensiloxane), a dimethylhydrogensiloxy-terminated poly(methylhydrogensiloxane), and a resin consisting essentially of $HMe_2SiO_{1/2}$ units, $Me_3SiO_{1/2}$ units, and $SiO_{4/2}$ units, wherein Me is methyl.

The organohydrogensiloxane can also be an organohydrogenpolysiloxane resin having he formula $(R^1R^4{}_2SiO_{1/2})_w$ $(R^4{}_2SiO_{2/2})_x(R^1SiO_{3/2})_y(SiO_{4/2})_z$ (II), wherein $R^1$ is $C_1$ to $C_{10}$ hydrocarbyl or $C_1$ to $C_{10}$ halogen-substituted hydrocarbyl, both free of aliphatic unsaturation, $R^4$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z is from 0.2 to 0.99, and w+x is from 0.01 to 0.8, provided at least 50 mol % of the groups $R^4$ are organosilylalkyl.

The hydrocarbyl and halogen-substituted hydrocarbyl groups represented by $R^1$ are as described and exemplified above for the silicone resin of component (A). Examples of organosilylalkyl groups represented by $R^4$ include, but are not limited to, groups having the following formulae:

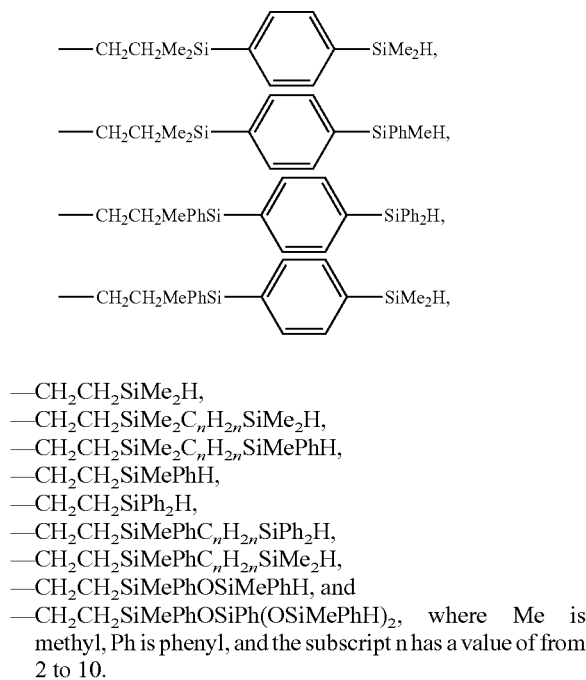

—$CH_2CH_2SiMe_2H$,
—$CH_2CH_2SiMe_2C_nH_{2n}SiMe_2H$,
—$CH_2CH_2SiMe_2C_nH_{2n}SiMePhH$,
—$CH_2CH_2SiMePhH$,
—$CH_2CH_2SiPh_2H$,
—$CH_2CH_2SiMePhC_nH_{2n}SiPh_2H$,
—$CH_2CH_2SiMePhC_nH_{2n}SiMe_2H$,
—$CH_2CH_2SiMePhOSiMePhH$, and
—$CH_2CH_2SiMePhOSiPh(OSiMePhH)_2$, where Me is methyl, Ph is phenyl, and the subscript n has a value of from 2 to 10.

In the formula (II) of the organohydrogenpolysiloxane resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the sum y+z is typically from 0.2 to 0.99, alternatively from 0.5 to 0.95, alternatively from 0.65 to 0.9. Further, the sum w+x is typically from 0.01 to 0.80, alternatively from 0.05 to 0.5, alternatively from 0.1 to 0.35.

Typically, at least 50 mol %, alternatively at least 65 mol %, alternatively at least 80 mol % of the groups $R^4$ in the organohydrogenpolysiloxane resin are organosilylalkyl groups having at least one silicon-bonded hydrogen atom.

The organohydrogenpolysiloxane resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The organohydrogenpolysiloxane resin typically contains less than 10% (w/w), alternatively less than 5% (w/w), alternatively less than 2% (w/w), of silicon-bonded hydroxy groups, as determined by $^{29}$Si NMR.

The organohydrogenpolysiloxane resin contains $R^1SiO_{3/2}$ units (i.e., T units) and/or $SiO_{4/2}$ units (i.e., Q units) in combination with $R^1R^4{}_2SiO_{1/2}$ units (i.e., M units) and/or $R^4{}_2SiO_{2/2}$ units (i.e., D units), where $R^1$ and $R^4$ are as described and exemplified above. For example, the organohydrogenpolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of organohydrogenpolysiloxane resins include, but are not limited to, resins having the following formulae:
$((HMe_2SiC_6H_4SiMe_2CH_2CH_2)_2MeSiO_{1/2})_{0.12}(PhSiO_{3/2})_{0.88}$,
$((HMe_2SiC_6H_4SiMe_2CH_2CH_2)_2MeSiO_{1/2})_{0.17}(PhSiO_{3/2})_{0.83}$,
$((HMe_2SiC_6H_4SiMe_2CH_2CH_2)_2MeSiO_{1/2})_{0.17}(MeSiO_{3/2})_{0.17}(PhSiO_{3/2})_{0.66}$,
$((HMe_2SiC_6H_4SiMe_2CH_2CH_2)_2MeSiO_{1/2})_{0.15}(PhSiO_{3/2})_{0.75}(SiO_{4/2})_{0.10}$, and
$((HMe_2SiC_6H_4SiMe_2CH_2CH_2)_2MeSiO_{1/2})_{0.08}((HMe_2SiC_6H_4SiMe_2CH_2CH_2)Me_2SiO_{1/2})_{0.06}(PhSiO_{3/2})_{0.86}$, where Me is methyl, Ph is phenyl, $C_6H_4$ denotes a paraphenylene group, and the numerical subscripts outside the parenthesis denote mole fractions. Also, in the preceding formulae, the sequence of units is unspecified.

Component (B) can be a single organosilicon compound or a mixture comprising two or more different organosilicon compounds, each as described above. For example, component (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. In particular, component (B) can be a mixture comprising at least 0.5% (w/w), alternatively at least 50% (w/w), alternatively at least 75% (w/w), based on the total weight of component (B), of the organohydrogenpolysiloxane resin having the formula (II), and an organohydrogensilane and/or organohydrogensiloxane, the latter different from the organohydrogenpolysiloxane resin.

The concentration of component (B) is sufficient to cure (cross-link) the silicone resin of component (A). The exact amount of component (B) depends on the desired extent of cure, which generally increases as the ratio of the number of moles of silicon-bonded hydrogen atoms in component (B) to the number of moles of alkenyl groups in component (A) increases. The concentration of component (B) is typically sufficient to provide from 0.4 to 2 moles of silicon-bonded hydrogen atoms, alternatively from 0.8 to 1.5 moles of silicon-bonded hydrogen atoms, alternatively from 0.9 to 1.1 moles of silicon-bonded hydrogen atoms, per mole of alkenyl groups in component (A).

Methods of preparing organosilicon compounds containing silicon-bonded hydrogen atoms are well known in the art. For example, organohydrogensilanes can be prepared by reaction of Grignard reagents with alkyl or aryl halides. In particular, organohydrogensilanes having the formula $HR^1{}_2Si—R^3—SiR^1{}_2H$ can be prepared by treating an aryl dihalide having the formula $R^3X_2$ with magnesium in ether to produce the corresponding Grignard reagent and then treating the Grignard reagent with a chlorosilane having the formula $HR^1{}_2SiCl$, where $R^1$ and $R^3$ are as described and exemplified above.

Methods of preparing organohydrogensiloxanes, such as the hydrolysis and condensation of organohalosilanes, are also well known in the art.

In addition, the organohydrogenpolysiloxane resin having the formula (II) can be prepared by reacting (a) a silicone resin having the formula $(R^1R^2_2SiO_{1/2})_w(R^2_2SiO_{2/2})_x (R^1SiO_{3/2})_y(SiO_{4/2})_z$ with (b) an organosilicon compound having an average of from two to four silicon-bonded hydrogen atoms per molecule and a molecular weight less than 1,000, in the presence of (c) a hydrosilylation catalyst and, optionally, (d) an organic solvent, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z is from 0.2 to 0.99, and w+x is from 0.01 to 0.8, provided the silicone resin (a) has an average of at least two silicon-bonded alkenyl groups per molecule, and the mole ratio of silicon-bonded hydrogen atoms in (b) to alkenyl groups in (a) is from 1.5 to 5.

Organosilicon compound (b) is at least one organosilicon compound having an average of from two to four silicon-bonded hydrogen atoms per molecule. Alternatively, the organosilicon compound has an average of from two to three silicon-bonded hydrogen atoms per molecule. The organosilicon compound typically has a molecular weight less than 1,000, alternatively less than 750, alternatively less than 500. The silicon-bonded organic groups in the organosilicon compound are selected from hydrocarbyl and halogen-substituted hydrocarbyl groups, both free of aliphatic unsaturation, which are as described and exemplified above for $R^1$ in the formula of the silicone resin of component (A).

Organosilicon compound (b) can be an organohydrogensilane or an organohydrogensiloxane. The organohydrogensilane can be a monosilane, disilane, trisilane, or polysilane. Similarly, the organohydrogensiloxane can be a disiloxane, disiloxane, or polysiloxane. The structure of the organosilicon compound can be linear, branched, or cyclic. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, and 1,3,5-trimethyl-1,3,5-trisilane. The organohydrogensilane can also have the formula $HR^1_2Si—R^3—SiR^1_2H$, wherein $R^1$ and $R^3$ are as described and exemplified above.

Examples of organohydrogensiloxanes include, but are not limited to, 1,1,3,3-tetramethyldisiloxane, 1,1,3,3-tetraphenyldisiloxane, phenyltris(dimethylsiloxy)silane, and 1,3,5-trimethylcyclotrisiloxane.

Organosilicon compound (b) can be a single organosilicon compound or a mixture comprising two or more different organosilicon compounds, each as described above. For example, component (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane.

Methods of preparing organohydrogensilanes, such as the reaction of Grignard reagents with alkyl or aryl halides, described above, are well known in the art. Similarly, methods of preparing organohydrogensiloxanes, such as the hydrolysis and condensation of organohalosilanes, are well known in the art.

Hydrosilylation catalyst (c) can be any of the well-known hydrosilylation catalysts comprising a platinum group metal (i.e., platinum, rhodium, ruthenium, palladium, osmium and iridium) or a compound containing a platinum group metal. Preferably, the platinum group metal is platinum, based on its high activity in hydrosilylation reactions.

Hydrosilylation catalysts include the complexes of chloroplatinic acid and certain vinyl-containing organosiloxanes disclosed by Willing in U.S. Pat. No. 3,419,593, which is hereby incorporated by reference. A catalyst of this type is the reaction product of chloroplatinic acid and 1,3-diethenyl-1,1,3,3-tetramethyldisiloxane.

The hydrosilylation catalyst can also be a supported hydrosilylation catalyst comprising a solid support having a platinum group metal on the surface thereof. A supported catalyst can be conveniently separated from the organohydrogenpolysiloxane resin product, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

Organic solvent (d) is at least one organic solvent. The organic solvent can be any aprotic or dipolar aprotic organic solvent that does not react with silicone resin (a), organosilicon compound (b), or the organohydrogenpolysiloxane resin under the conditions of the present method, and is miscible with components (a), (b), and the organohydrogenpolysiloxane resin.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (d) can be a single organic solvent or a mixture comprising two or more different organic solvents, each as described above.

The reaction can be carried out in any standard reactor suitable for hydrosilylation reactions. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

The silicone resin, organosilicon compound, hydrosilylation catalyst, and, optionally, organic solvent, can be combined in any order. Typically, organosilicon compound (b) and hydrosilylation catalyst (c) are combined before the introduction of the silicone resin (a) and, optionally, organic solvent (d).

The reaction is typically carried out at a temperature of from 0 to 150° C., alternatively from room temperature (~23±2° C.) to 115° C. When the temperature is less than 0° C., the rate of reaction is typically very slow.

The reaction time depends on several factors, such as the structures of the silicone resin and the organosilicon compound, and the temperature. The time of reaction is typically from 1 to 24 h at a temperature of from room temperature (~23±2° C.) to 150° C. The optimum reaction time can be determined by routine experimentation using the methods set forth in the Examples section below.

The mole ratio of silicon-bonded hydrogen atoms in organosilicon compound (b) to alkenyl groups in silicone resin (a) is typically from 1.5 to 5, alternatively from 1.75 to 3, alternatively from 2 to 2.5.

The concentration of hydrosilylation catalyst (c) is sufficient to catalyze the addition reaction of silicone resin (a) with organosilicon compound (b). Typically, the concentration of hydrosilylation catalyst (c) is sufficient to provide from 0.1 to 1000 ppm of a platinum group metal, alternatively from 1 to 500 ppm of a platinum group metal, alternatively from 5 to 150 ppm of a platinum group metal, based on the combined weight of silicone resin (a) and organosilicon compound (b). The rate of reaction is very slow below 0.1 ppm of platinum group metal. The use of more than 1000 ppm of platinum group metal results in no appreciable increase in reaction rate, and is therefore uneconomical.

The concentration of organic solvent (d) is typically from 0 to 99% (w/w), alternatively from 30 to 80% (w/w), alternatively from 45 to 60% (w/w), based on the total weight of the reaction mixture.

The organohydrogenpolysiloxane resin can be used without isolation or purification in the first embodiment of the hydrosilylation-curable silicone composition or the resin can be separated from most of the solvent by conventional methods of evaporation. For example, the reaction mixture can be heated under reduced pressure. Moreover, when the hydrosilylation catalyst used to prepare the organohydrogenpolysiloxane resin is a supported catalyst, described above, the resin can be readily separated from the hydrosilylation catalyst by filtering the reaction mixture. However, when the organohydrogenpolysiloxane resin is not separated from the hydrosilylation catalyst used to prepare the resin, the catalyst may be used as component (C) of the first embodiment of the hydrosilylation-curable silicone composition.

Component (C) of the hydrosilylation-curable silicone composition is at least one hydrosilylation catalyst that promotes the addition reaction of component (A) with component (B). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein; and U.S. Pat. No. 5,017,654.

Component (C) can be a single hydrosilylation catalyst or a mixture comprising two or more different catalysts that differ in at least one property, such as structure, form, platinum group metal, complexing ligand, and thermoplastic resin.

The concentration of component (C) is sufficient to catalyze the addition reaction of component (A) with component (B). Typically, the concentration of component (C) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A) and (B). The rate of cure is very slow below 0.1 ppm of platinum group metal. The use of more than 1000 ppm of platinum group metal results in no appreciable increase in cure rate, and is therefore uneconomical.

According to a second embodiment, the hydrosilylation-curable silicone composition comprises (A') a silicone resin having the formula $(R^1R^5{}_2SiO_{1/2})_w(R^5{}_2SiO_{2/2})_x(R^5SiO_{3/2})_y(SiO_{4/2})_z$ (III), wherein $R^1$ is $C_1$ to $C_{10}$ hydrocarbyl or $C_1$ to $C_{10}$ halogen-substituted hydrocarbyl, both free of aliphatic unsaturation, $R^5$ is $R^1$ or —H, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded hydrogen atoms per molecule; (B') an organosilicon compound having an average of at least two silicon-bonded alkenyl groups per molecule in an amount sufficient to cure the silicone resin; and (C) a catalytic amount of a hydrosilylation catalyst.

Component (A') is at least one silicone resin having the formula $(R^1R^5{}_2SiO_{1/2})_w(R^5{}_2SiO_{2/2})_x(R^5SiO_{3/2})_y(SiO_{4/2})_z$ (III), wherein $R^1$ is $C_1$ to $C_{10}$ hydrocarbyl or $C_1$ to $C_{10}$ halogen-substituted hydrocarbyl, both free of aliphatic unsaturation, $R^5$ is $R^1$ or —H, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded hydrogen atoms per molecule. In the formula (III), $R^1$, w, x, y, z, y+z, and w+x are as described and exemplified above for the silicone resin having the formula (I).

Typically at least 50 mol %, alternatively at least 65 mol %, alternatively at least 80 mol % of the groups $R^5$ in the silicone resin are hydrogen.

The silicone resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

The silicone resin typically contains less than 10% (w/w), alternatively less than 5% (w/w), alternatively less than 2% (w/w), of silicon-bonded hydroxy groups, as determined by $^{29}$Si NMR.

The silicone resin contains $R^5SiO_{3/2}$ units (i.e., T units), $R^5SiO_{3/2}$ units (i.e., T units) and $SiO_{4/2}$ units (i.e., Q units), or $R^5SiO_{3/2}$ units (i.e., T units) and/or $SiO_{4/2}$ units (i.e., Q units) in combination with $R^1R^5{}_2SiO_{1/2}$ units (i.e., M units) and/or $R^5{}_2SiO_{2/2}$ units (i.e., D units). For example, the silicone resin can be a T resin, a TQ resin, a DT resin, an MT resin, an MDT resin, an MQ resin, a DQ resin, an MDQ resin, an MTQ resin, a DTQ resin, or an MDTQ resin.

Examples of silicone resins suitable for use as component (A') include, but are not limited to, resins having the following formulae:
$(HMe_2SiO_{1/2})_{0.25}(PhSiO_{3/2})_{0.75}$, $(HMeSiO_{2/2})_{0.3}(PhSiO_{3/2})_{0.6}(MeSiO_{3/2})_{0.1}$, and $(Me_3SiO_{1/2})_{0.1}(H_2SiO_{2/2})_{0.1}(MeSiO_{3/2})_{0.4}(PhSiO_{3/2})_{0.4}$, where Me is methyl, Ph is phenyl, and the numerical subscripts outside the parenthesis denote mole fractions. Also, in the preceding formulae, the sequence of units is unspecified.

Component (A') can be a single silicone resin or a mixture comprising two or more different silicone resins, each as described above.

Methods of preparing silicone resins containing silicon-bonded hydrogen atoms are well known in the art; many of these resins are commercially available. Silicone resins are typically prepared by cohydrolyzing the appropriate mixture of chlorosilane precursors in an organic solvent, such as toluene. For example, a silicone resin consisting essentially of $R^1R^5{}_2SiO_{1/2}$ units and $R^5SiO_{3/2}$ units can be prepared by cohydrolyzing a compound having the formula $R^1R^5{}_2SiCl$ and a compound having the formula $R^5SiCl_3$ in toluene, where $R^1$ and $R^5$ are as described and exemplified above. The aqueous hydrochloric acid and silicone hydrolyzate are separated and the hydrolyzate is washed with water to remove residual acid and heated in the presence of a mild non-basic condensation catalyst to "body" the resin to the requisite viscosity. If desired, the resin can be further treated with a non-basic condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

Component (B') is at least one organosilicon compound having an average of at least two silicon-bonded alkenyl groups per molecule in an amount sufficient to cure the silicone resin of component (A').

The organosilicon compound contains an average of at least two silicon-bonded alkenyl groups per molecule, alternatively at least three silicon-bonded alkenyl groups per molecule. It is generally understood that cross-linking occurs when the sum of the average number of silicon-bonded hydrogen atoms per molecule in component (A') and the average number of silicon-bonded alkenyl groups per molecule in component (B') is greater than four.

The organosilicon compound can be an organosilane or an organosiloxane. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl groups can be located at terminal, pendant, or at both terminal and pendant positions.

Examples of organosilanes suitable for use as component (B') include, but are not limited to, silanes having the following formulae:
Vi$_4$Si, PhSiVi$_3$, MeSiVi$_3$, PhMeSiVi$_2$, Ph$_2$SiVi$_2$, and PhSi(CH$_2$CH=CH$_2$)$_3$, where Me is methyl, Ph is phenyl, and Vi is vinyl.

Examples of organosiloxanes suitable for use as component (B') include, but are not limited to, siloxanes having the following formulae:
PhSi(OSiMe$_2$Vi)$_3$, Si(OSiMe$_2$Vi)$_4$, MeSi(OSiMe$_2$Vi)$_3$, and Ph$_2$Si(OSiMe$_2$Vi)$_2$, where Me is methyl, Ph is phenyl, and Vi is vinyl.

Component (B') can be a single organosilicon compound or a mixture comprising two or more different organosilicon compounds, each as described above. For example component (B') can be a single organosilane, a mixture of two different organosilanes, a single organosiloxane, a mixture of two different organosiloxanes, or a mixture of an organosilane and an organosiloxane.

The concentration of component (B') is sufficient to cure (cross-link) the silicone resin of component (A'). The exact amount of component (B') depends on the desired extent of cure, which generally increases as the ratio of the number of moles of silicon-bonded alkenyl groups in component (B') to the number of moles of silicon-bonded hydrogen atoms in component (A') increases. The concentration of component (B') is typically sufficient to provide from 0.4 to 2 moles of silicon-bonded alkenyl groups, alternatively from 0.8 to 1.5 moles of silicon-bonded alkenyl groups, alternatively from 0.9 to 1.1 moles of silicon-bonded alkenyl groups, per mole of silicon-bonded hydrogen atoms in component (A').

Methods of preparing organosilanes and organosiloxanes containing silicon-bonded alkenyl groups are well known in the art; many of these compounds are commercially available.

Component (C) of the second embodiment of the silicone composition is as described and exemplified above for component (C) of the first embodiment.

According to a third embodiment, the hydrosilylation-curable silicone composition comprises (A) a silicone resin having the formula $(R^1R^2{}_2SiO_{1/2})_w(R^2{}_2SiO_{2/2})_x(R^2SiO_{3/2})_y(SiO_{4/2})_z$ (I); (B) an organosilicon compound having an average of at least two silicon-bonded hydrogen atoms per molecule in an amount sufficient to cure the silicone resin; (C) a catalytic amount of a hydrosilylation catalyst; and (D) a silicone rubber having a formula selected from (i) $R^1R^2{}_2SiO(R^2{}_2SiO)_aSiR^2{}_2R^1$ (IV) and (ii) $R^5R^1{}_2SiO(R^1R^5SiO)_bSiR^1{}_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscripts a and b each have a value of from 1 to 4, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin and the silicone rubber (D)(i) each have an average of at least two silicon-bonded alkenyl groups per molecule, the silicone rubber (D)(ii) has an average of at least two silicon-bonded hydrogen atoms per molecule, and the mole ratio of silicon-bonded alkenyl groups or silicon-bonded hydrogen atoms in the silicone rubber (D) to silicon-bonded alkenyl groups in the silicone resin (A) is from 0.01 to 0.5.

Components (A), (B), and (C) of the third embodiment of the silicone composition are as described and exemplified above for the first embodiment.

The concentration of component (B) is sufficient to cure (cross-link) the silicone resin of component (A). When component (D) is (D)(i), the concentration of component (B) is such that the ratio of the number of moles of silicon-bonded hydrogen atoms in component (B) to the sum of the number of moles of silicon-bonded alkenyl groups in component (A) and component (D)(i) is typically from 0.4 to 2, alternatively from 0.8 to 1.5, alternatively from 0.9 to 1.1. Furthermore, when component (D) is (D)(ii), the concentration of component (B) is such that the ratio of the sum of the number of moles of silicon-bonded hydrogen atoms in component (B) and component (D)(ii) to the number of moles of silicon-bonded alkenyl groups in component (A) is typically from 0.4 to 2, alternatively from 0.8 to 1.5, alternatively from 0.9 to 1.1.

Component (D) is a silicone rubber having a formula selected from (i) $R^1R^2{}_2SiO(R^2{}_2SiO)_aSiR^2{}_2R^1$ (IV) and (ii) $R^5R^1{}_2SiO(R^1R^5SiO)_bSiR^1{}_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, and subscripts a and b each have a value of from 1 to 4, provided the silicone rubber (D)(i) has an average of at least two silicon-bonded alkenyl groups per molecule, and the silicone rubber (D)(ii) has an average of at least two silicon-bonded hydrogen atoms per molecule.

Component (D)(i) is at least one silicone rubber having the formula $R^1R^2_2SiO(R^2_2SiO)_aSiR^2_2R^1$ (IV), wherein $R^1$ and $R^2$ are as described and exemplified above and the subscript a has a value of from 1 to 4, provided the silicone rubber (D)(i) has an average of at least two silicon-bonded alkenyl groups per molecule. Alternatively, the subscript a has a value of from 2 to 4 or from 2 to 3.

Examples of silicone rubbers suitable for use as component (D)(i) include, but are not limited to, silicone rubbers having the following formulae:
$ViMe_2SiO(Me_2SiO)_aSiMe_2Vi$, $ViMe_2SiO(Ph_2SiO)_a SiMe_2Vi$, and $ViMe_2SiO(PhMeSiO)_aSiMe_2Vi$, where Me is methyl, Ph is phenyl, Vi is vinyl, and the subscript a has a value of from 1 to 4.

Component (D)(i) can be a single silicone rubber or a mixture comprising two or more different silicone rubbers, each having the formula (IV).

Component (D)(ii) is at least one silicone rubber having the formula $R^5R^1_2SiO(R^1R^5SiO)_bSiR^1_2R^5$ (V); wherein $R^1$ and $R^5$ are as described and exemplified above, and the subscript b has a value of from 1 to 4, provided the silicone rubber (D)(ii) has an average of at least two silicon-bonded hydrogen atoms per molecule. Alternatively, the subscript b has a value of from 2 to 4 or from 2 to 3.

Examples of silicone rubbers suitable for use as component (D)(ii) include, but are not limited to, silicone rubbers having the following formulae:
$HMe_2SiO(Me_2SiO)_bSiMe_2H$, $HMe_2SiO(Ph_2SiO)_bSiMe_2H$, $HMe_2SiO(PhMeSiO)_bSiMe_2H$, and $HMe_2SiO(Ph_2SiO)_2 (Me_2SiO)_2SiMe_2H$, where Me is methyl, Ph is phenyl, and the subscript b has a value of from 1 to 4.

Component (D)(ii) can be a single silicone rubber or a mixture comprising two or more different silicone rubbers, each having the formula (V).

The mole ratio of silicon-bonded alkenyl groups or silicon-bonded hydrogen atoms in the silicone rubber (D) to silicon-bonded alkenyl groups in the silicone resin (A) is typically from 0.01 to 0.5, alternatively from 0.05 to 0.4, alternatively from 0.1 to 0.3.

Methods of preparing silicone rubbers containing silicon-bonded alkenyl groups or silicon-bonded hydrogen atoms are well known in the art; many of these compounds are commercially available.

According to a fourth embodiment, the hydrosilylation-curable silicone composition comprises (A') a silicone resin having the formula $(R^1R^5_2SiO_{1/2})_w(R^5_2SiO_{2/2})_x(R^5SiO_{3/2})_y (SiO_{4/2})_z$ (III); (B') an organosilicon compound having an average of at least two silicon-bonded alkenyl groups per molecule in an amount sufficient to cure the silicone resin; (C) a catalytic amount of a hydrosilylation catalyst; and (D) a silicone rubber having a formula selected from (i) $R^1R^2_2SiO (R^2_2SiO)_aSiR^2_2R^1$ (IV) and (ii) $R^5R^1_2SiO(R^1R^5SiO)_b SiR^1_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscripts a an b each have a value of from 1 to 4, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin and the silicone rubber (D)(ii) each have an average of at least two silicon-bonded hydrogen atoms per molecule, the silicone rubber (D)(i) has an average of at least two silicon-bonded alkenyl groups per molecule, and the mole ratio of silicon-bonded alkenyl groups or silicon-bonded hydrogen atoms in the silicone rubber (D) to silicon-bonded hydrogen atoms in the silicone resin (A') is from 0.01 to 0.5.

Components (A'), (B'), and (C) of the fourth embodiment of the silicone composition are as described and exemplified above for the second embodiment, and component (D) of the fourth embodiment is as described and exemplified above for the third embodiment.

The concentration of component (B') is sufficient to cure (cross-link) the silicone resin of component (A'). When component (D) is (D)(i), the concentration of component (B') is such that the ratio of the sum of the number of moles of silicon-bonded alkenyl groups in component (B') and component (D)(i) to the number of moles of silicon-bonded hydrogen atoms in component (A') is typically from 0.4 to 2, alternatively from 0.8 to 1.5, alternatively from 0.9 to 1.1. Furthermore, when component (D) is (D)(ii), the concentration of component (B') is such that the ratio of the number of moles of silicon-bonded alkenyl groups in component (B') to the sum of the number of moles of silicon-bonded hydrogen atoms in component (A') and component (D)(ii) is typically from 0.4 to 2, alternatively from 0.8 to 1.5, alternatively from 0.9 to 1.1.

The mole ratio of silicon-bonded alkenyl groups or silicon-bonded hydrogen atoms in the silicone rubber (D) to silicon-bonded hydrogen atoms in the silicone resin (A') is typically from 0.01 to 0.5, alternatively from 0.05 to 0.4, alternatively from 0.1 to 0.3.

According to a fifth embodiment, the hydrosilylation-curable silicone composition comprises (A'') a rubber-modified silicone resin prepared by reacting a silicone resin having the formula $(R^1R^2_2SiO_{1/2})_w(R^2_2SiO_{2/2})_x(R^2SiO_{3/2})_y(SiO_{4/2})_z$ (I) and a silicone rubber having the formula $R^5R^1_2SiO (R^1R^5SiO)_cSiR^1_2R^5$ (VI) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, c has a value of from greater than 4 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (I) has an average of at least two silicon-bonded alkenyl groups per molecule, the silicone rubber (VI) has an average of at least two silicon-bonded hydrogen atoms per molecule, and the mole ratio of silicon-bonded hydrogen atoms in the silicone rubber (VI) to silicon-bonded alkenyl groups in silicone resin (I) is from 0.01 to 0.5; (B) an organosilicon compound having an average of at least two silicon-bonded hydrogen atoms per molecule in an amount sufficient to cure the rubber-modified silicone resin; and (C) a catalytic amount of a hydrosilylation catalyst.

Components (B) and (C) of the fifth embodiment of the silicone composition are as described and exemplified above for the first embodiment.

The concentration of component (B) is sufficient to cure (cross-link) the rubber-modified silicone resin. The concentration of component (B) is such that the ratio of the sum of the number of moles of silicon-bonded hydrogen atoms in component (B) and the silicone rubber (VI) to the number of moles of silicon-bonded alkenyl groups in the silicone resin (I) is typically from 0.4 to 2, alternatively from 0.8 to 1.5, alternatively from 0.9 to 1.1.

Component (A'') is a rubber-modified silicone resin prepared by reacting at least one silicone resin having the formula $(R^1R^2_2SiO_{1/2})_w(R^2_2SiO_{2/2})_x(R^2SiO_{3/2})_y(SiO_{4/2})_z$ (I) and at least one silicone rubber having the formula $R^5R^1_2SiO (R^1R^5SiO)_cSiR^1_2R^5$ (VI) in the presence of a hydrosilylation catalyst and, optionally, an organic solvent to form a soluble reaction product, wherein $R^1$, $R^2$, $R^5$, w, x, y, z, y+z, and w+x are as described and exemplified above, and the subscript c has a value of from greater than 4 to 1,000.

The silicone resin having the formula (I) is as described and exemplified above for the first embodiment of the silicone composition. Also, the hydrosilylation catalyst and organic solvent are as described and exemplified above in the method of preparing the organohydrogenpolysiloxane resin having the formula (II). As used herein the term "soluble reaction product" means when organic solvent is present, the product of the reaction for preparing component (A") is miscible in the organic solvent and does not form a precipitate or suspension.

In the formula (VI) of the silicone rubber, $R^1$ and $R^5$ are as described and exemplified above, and the subscript c typically has a value of from greater than 4 to 1,000, alternatively from 10 to 500, alternatively from 10 to 50.

Examples of silicone rubbers having the formula (VI) include, but are not limited to, silicone rubbers having the following formulae:
$HMe_2SiO(Me_2SiO)_{50}SiMe_2H$, $HMe_2SiO(Me_2SiO)_{10}SiMe_2H$, $HMe_2SiO(PhMeSiO)_{25}SiMe_2H$, and $Me_3SiO(MeHSiO)_{10}SiMe_3$, wherein Me is methyl, Ph is phenyl, and the numerical subscripts indicate the number of each type of siloxane unit.

The silicone rubber having the formula (VI) can be a single silicone rubber or a mixture comprising two or more different silicone rubbers, each having the formula (VI).

Methods of preparing silicone rubbers containing silicon-bonded hydrogen atoms are well known in the art; many of these compounds are commercially available.

The silicone resin (I), silicone rubber (VI), hydrosilylation catalyst, and organic solvent can be combined in any order. Typically, the silicone resin, silicone rubber, and organic solvent are combined before the introduction of the hydrosilylation catalyst.

The reaction is typically carried out at a temperature of from room temperature (~23±2° C.) to 150° C., alternatively from room temperature to 100° C.

The reaction time depends on several factors, including the structures of the silicone resin and the silicone rubber, and the temperature. The components are typically allowed to react for a period of time sufficient to complete the hydrosilylation reaction. This means the components are typically allowed to react until at least 95 mol %, alternatively at least 98 mol %, alternatively at least 99 mol %, of the silicon-bonded hydrogen atoms originally present in the silicone rubber have been consumed in the hydrosilylation reaction, as determined by FTIR spectrometry. The time of reaction is typically from 0.5 to 24 h at a temperature of from room temperature (~23±2° C.) to 100° C. The optimum reaction time can be determined by routine experimentation using the methods set forth in the Examples section below.

The mole ratio of silicon-bonded hydrogen atoms in the silicone rubber (VI) to silicon-bonded alkenyl groups in the silicone resin (I) is typically from 0.01 to 0.5, alternatively from 0.05 to 0.4, alternatively from 0.1 to 0.3.

The concentration of the hydrosilylation catalyst is sufficient to catalyze the addition reaction of the silicone resin (I) with the silicone rubber (VI). Typically, the concentration of the hydrosilylation catalyst is sufficient to provide from 0.1 to 1000 ppm of a platinum group metal, based on the combined weight of the resin and the rubber.

The concentration of the organic solvent is typically from 0 to 95% (w/w), alternatively from 10 to 75% (w/w), alternatively from 40 to 60% (w/w), based on the total weight of the reaction mixture.

The rubber-modified silicone resin can be used without isolation or purification in the fifth embodiment of the hydrosilylation-curable silicone composition or the resin can be separated from most of the solvent by conventional methods of evaporation. For example, the reaction mixture can be heated under reduced pressure. Moreover, when the hydrosilylation catalyst is a supported catalyst, described above, the rubber-modified silicone resin can be readily separated from the hydrosilylation catalyst by filtering the reaction mixture. However, when the rubber-modified silicone resin is not separated from the hydrosilylation catalyst used to prepare the resin, the catalyst may be used as component (C) of the fifth embodiment of the hydrosilylation-curable silicone composition.

According to a sixth embodiment, the hydrosilylation-curable silicone composition comprises (A''') a rubber-modified silicone resin prepared by reacting a silicone resin having the formula $(R^1R^5{}_2SiO_{1/2})_w(R^5{}_2SiO_{2/2})_x(R^5SiO_{3/2})_y(SiO_{4/2})_z$ (III) and a silicone rubber having the formula $R^1R^2{}_2SiO(R^2{}_2SiO)_dSiR^2{}_2R^1$ (VII) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript d has a value of from greater than 4 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (III) has an average of at least two silicon-bonded hydrogen atoms per molecule, the silicone rubber (VII) has an average of at least two silicon-bonded alkenyl groups per molecule, and the mole ratio of silicon-bonded alkenyl groups in the silicone rubber (VII) to silicon-bonded hydrogen atoms in the silicone resin (III) is from 0.01 to 0.5; (B') an organosilicon compound having an average of at least two silicon-bonded alkenyl groups per molecule in an amount sufficient to cure the rubber-modified silicone resin; and (C) a catalytic amount of a hydrosilylation catalyst.

Components (B') and (C) of the sixth embodiment of the silicone composition are as described and exemplified above for the second embodiment.

The concentration of component (B') is sufficient to cure (cross-link) the rubber-modified silicone resin. The concentration of component (B') is such that the ratio of the sum of the number of moles of silicon-bonded alkenyl groups in component (B') and the silicone rubber (VII) to the number of moles of silicon-bonded hydrogen atoms in the silicone resin (III) is typically from 0.4 to 2, alternatively from 0.8 to 1.5, alternatively from 0.9 to 1.1.

Component (A''') is a rubber-modified silicone resin prepared by reacting at least one silicone resin having the formula $(R^1R^5{}_2SiO_{1/2})_w(R^5{}_2SiO_{2/2})_x(R^5SiO_{3/2})_y(SiO_{4/2})_z$ (III) and at least one silicone rubber having the formula $R^1R^2{}_2SiO(R^2{}_2SiO)_dSiR^2{}_2R^1$ (VII) in the presence of a hydrosilylation catalyst and an organic solvent to form a soluble reaction product, wherein $R^1$, $R^2$, $R^5$, w, x, y, z, y+z, and w+x are as described and exemplified above, and the subscript d has a value of from greater than 4 to 1,000.

The silicone resin having the formula (III) is as described and exemplified above for the second embodiment of the hydrosilylation-curable silicone composition. Also, the hydrosilylation catalyst and organic solvent are as described and exemplified above in the method of preparing the organohydrogenpolysiloxane resin having the formula (II). As in the previous embodiment of the silicone composition, the term "soluble reaction product" means when organic solvent is present, the product of the reaction for preparing component (A''') is miscible in the organic solvent and does not form a precipitate or suspension.

In the formula (VII) of the silicone rubber, $R^1$ and $R^2$ are as described and exemplified above, and the subscript d typically has a value of from 4 to 1,000, alternatively from 10 to 500, alternatively form 10 to 50.

Examples of silicone rubbers having the formula (VII) include, but are not limited to silicone rubbers having the following formulae:
$ViMe_2SiO(Me_2SiO)_{50}SiMe_2Vi$, $ViMe_2SiO(Me_2SiO)_{10}SiMe_2Vi$, $ViMe_2SiO(PhMeSiO)_{25}SiMe_2Vi$, and $Vi_2MeSiO(PhMeSiO)_{25}SiMe_2Vi$, wherein Me is methyl, Ph is phenyl, Vi is vinyl, and the numerical subscripts indicate the number or each type of siloxane unit.

The silicone rubber having the formula (VII) can be a single silicone rubber or a mixture comprising two or more different silicone rubbers, each having the formula (VII).

Methods of preparing silicone rubbers containing silicon-bonded alkenyl groups are well known in the art; many of these compounds are commercially available.

The reaction for preparing component (A''') can be carried out in the manner described above for preparing component (A'') of the fifth embodiment of the silicone composition, except the silicone resin having the formula (I) and the silicone rubber having the formula (VI) are replaced with the resin having the formula (III) and the rubber having the formula (VII), respectively. The mole ratio of silicon-bonded alkenyl groups in the silicone rubber (VII) to silicon-bonded hydrogen atoms in the silicone resin (III) is from 0.01 to 0.5, alternatively from 0.05 to 0.4, alternatively from 0.1 to 0.3. Moreover, the silicone resin and the silicone rubber are typically allowed to react for a period of time sufficient to complete the hydrosilylation reaction. This means the components are typically allowed to react until at least 95 mol %, alternatively at least 98 mol %, alternatively at least 99 mol %, of the silicon-bonded alkenyl groups originally present in the rubber have been consumed in the hydrosilylation reaction, as determined by FTIR spectrometry.

The hydrosilylation-curable silicone composition of the present method can comprise additional ingredients, provided the ingredient does not prevent the silicone composition from curing to form a cured silicone resin having low coefficient of thermal expansion, high tensile strength, and high modulus, as described below. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; anti-oxidants; heat stabilizers; UV stabilizers; flame retardants; flow control additives; and diluents, such as organic solvents and reactive diluents.

For example, the hydrosilylation-curable silicone composition can contain (E) a reactive diluent comprising (i) an organosiloxane having an average of at least two silicon-bonded alkenyl groups per molecule and a viscosity of from 0.001 to 2 Pa·s at 25° C., wherein the viscosity of (E)(i) is not greater than 20% of the viscosity of the silicone resin, e.g., component (A), (A'), (A''), or (A''') above, of the silicone composition and the organosiloxane has the formula $(R^1R^2_2SiO_{1/2})_m(R^2_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (E)(ii) per mole of alkenyl groups in (E)(i), wherein the organohydrogensiloxane has the formula $(HR^1_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

Component (E)(i) is at least one organosiloxane having an average of at least two alkenyl groups per molecule and a viscosity of from 0.001 to 2 Pa·s at 25° C., wherein the viscosity of (E)(i) is not greater than 20% of the viscosity of the silicone resin of the silicone composition and the organosiloxane has the formula $(R^1R^2_2SiO_{1/2})_m(R^2_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal (i.e., not all the alkenyl groups in the organosiloxane are in the $R^1R^2_2SiO_{1/2}$ units). Further, organosiloxane (E)(i) can have a linear, branched, or cyclic structure. For example, when the subscripts m, p, and q in the formula of organosiloxane (E)(i) are each equal to 0, the organosiloxane is an organocyclosiloxane.

The viscosity of organosiloxane (E)(i) at 25° C. is typically from 0.001 to 2 Pa·s, alternatively from 0.001 to 0.1 Pa·s, alternatively from 0.001 to 0.05 Pa·s. Further, the viscosity of organosiloxane (E)(i) at 25° C. is typically not greater than 20%, alternatively not greater than 10%, alternatively not greater than 1%, of the viscosity of the silicone resin in the hydrosilylation-curable silicone composition.

Examples of organosiloxanes suitable for use as organosiloxane (E)(i) include, but are not limited to, organosiloxanes having the following formulae:
$(ViMeSiO)_3$, $(ViMeSiO)_4$, $(ViMeSiO)_5$, $(ViMeSiO)_6$, $(ViPhSiO)_3$, $(ViPhSiO)_4$, $(ViPhSiO)_5$, $(ViPhSiO)_6$, $ViMe_2SiO(ViMeSiO)_nSiMe_2Vi$, $Me_3SiO(ViMeSiO)_nSiMe_3$, and $(ViMe_2SiO)_4Si$, where Me is methyl, Ph is phenyl, Vi is vinyl, and the subscript n has a value such that the organosiloxane has a viscosity of from 0.001 to 2 Pa·s at 25° C.

Component (E)(i) can be a single organosiloxane or a mixture comprising two or more different organosiloxanes, each as described above. Methods of making alkenyl-functional organosiloxanes are well known in the art.

Component (E)(ii) is at least one organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (E)(ii) to moles of alkenyl groups in (E)(i), wherein the organohydrogensiloxane has the formula $(HR^1_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

The viscosity of organohydrogensiloxane (E)(ii) at 25° C. is typically from 0.001 to 2 Pa·s, alternatively from 0.001 to 0.1 Pa·s, alternatively from 0.001 to 0.05 Pa·s.

Examples of organohydrogensiloxanes suitable for use as organohydrogensiloxane (E)(ii) include, but are not limited to, organohydrogensiloxanes having the following formulae:

PhSi(OSiMe$_2$H)$_3$, Si(OSiMe$_2$H)$_4$, MeSi(OSiMe$_2$H)$_3$, (HMe$_2$SiO)$_3$SiOSi(OSiMe$_2$H)$_3$, and (HMe$_2$SiO)$_3$SiOSi(Ph) (OSiMe$_2$H)$_2$, where Me is methyl and Ph is phenyl.

Component (E)(ii) can be a single organohydrogensiloxane or a mixture comprising two or more different organohydrogensiloxanes, each as described above. Methods of making organohydrogensiloxanes are well known in the art.

The concentration of component (E)(ii) is sufficient to provide from 0.5 to 3 moles of silicon-bonded hydrogen atoms, alternatively from 0.6 to 2 moles of silicon-bonded hydrogen atoms, alternatively from 0.9 to 1.5 moles of silicon-bonded hydrogen atoms, per mole of alkenyl groups in component (E)(i).

The concentration of the reactive diluent (E), components (E)(i) and (E)(ii) combined, in the hydrosilylation-curable silicone composition is typically from 0 to 90% (w/w), alternatively from 0 to 50% (w/w), alternatively from 0 to 20% (w/w), alternatively from 0 to 10% (w/w), based on the combined weight of the silicone resin, component (A), (A'),(A"), or (A'''), and the organosilicon compound, component (B) or (B') in the embodiments above.

The curable composition comprising a thermosetting polymer can further comprise a carbon nanomaterial, which is as described and exemplified above. When present, the carbon nanomaterial typically has a concentration of from 0.0001 to 99% (w/w), alternatively from 0.001 to 50% (w/w), alternatively from 0.01 to 25% (w/w), alternatively from 0.1 to 10% (w/w), alternatively from 1 to 5% (w/w), based on the total weight of the thermosetting polymer.

The release liner can be coated with the curable composition comprising a thermosetting polymer using conventional coating techniques, such as spin coating, dipping, spraying, brushing, extrusion, or screen-printing. The amount of the composition is sufficient to form a first polymer layer having a thickness of from 0.01 to 1000 μm after the polymer is cured in step (ii) of the method, described below.

In step (ii) of the immediately preceding method of forming the first polymer layer, the thermosetting polymer of the coated release liner is cured. The thermosetting polymer can be cured using a variety of methods, including exposing the polymer to ambient temperature, elevated temperature, moisture, or radiation, depending on the type of curable composition used to coat the release liner.

When the curable composition used to coat the release liner is a hydrosilylation-curable silicone composition comprising at least one silicone resin having an average of at least two silicon-bonded alkenyl groups or silicon-bonded hydrogen atoms per molecule, the silicone resin of the coated release liner can be cured by heating the coating at a temperature sufficient to cure the silicone resin. The coating can be heated at atmospheric, subatmospheric, or supraatmospheric pressure. The coating is typically heated at a temperature of from room temperature (~23±2° C.) to 250° C., alternatively from room temperature to 200° C., alternatively from room temperature to 150° C., at atmospheric pressure. The coating liner is heated for a length of time sufficient to cure (cross-link) the silicone resin. For example, the coating is typically heated at a temperature of from 150 to 200° C. for a time of from 0.1 to 3 h.

Alternatively, when the curable composition used to coat the release liner is a hydrosilylation-curable silicone composition comprising at least one silicone resin having an average of at least two silicon-bonded alkenyl groups or silicon-bonded hydrogen atoms per molecule, the silicone resin of the coated release liner can be cured by heating the coating in a vacuum at a temperature of from 100 to 200° C. and a pressure of from 1,000 to 20,000 Pa for a time of from 0.5 to 3 h. The coating can be heated in a vacuum using a conventional vacuum bagging process. In a typical process, a bleeder (e.g., polyester) is applied over the coated release liner, a breather (e.g, Nylon, polyester) is applied over the bleeder, a vacuum bagging film (e.g., Nylon) equipped with a vacuum nozzle is applied over the breather, the assembly is sealed with tape, a vacuum (e.g., 1,000 Pa) is applied to the sealed assembly, and the evacuated bag is heated as described above.

The method of forming the first polymer layer, wherein the layer comprises a thermoset polymer, can further comprise, after step (i) and before step (ii), applying a second release liner to the coated release liner of the first step to form an assembly, and compressing the assembly. The assembly can be compressed to remove excess composition and/or entrapped air, and to reduce the thickness of the coating. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature (~23±2° C.) to 50° C.

The method of forming the first polymer layer, wherein the layer comprises a thermoset polymer, can further comprise repeating the steps (i) and (ii) to increase the thickness of the polymer layer, provided the same curable composition is used for each coating step.

When the first polymer layer comprises a thermoplastic polymer and a fiber reinforcement, the polymer layer can be formed by (a) impregnating a fiber reinforcement in a composition comprising a thermoplastic polymer in a fluid state and (b) converting the thermoplastic polymer of the impregnated fiber reinforcement to a solid state.

In step (a) of the immediately preceding method of forming the first polymer layer, a fiber reinforcement is impregnated in a composition comprising a thermoplastic polymer in a fluid state.

The fiber reinforcement can be impregnated in a composition comprising a thermoplastic polymer in a fluid state using a variety of methods. For example, according to a first method, the fiber reinforcement can be impregnated by (i) applying a composition comprising a thermoplastic polymer in a fluid state to a release liner to form a film; (ii) embedding a fiber reinforcement in the film; and (iii) applying the composition to the embedded fiber reinforcement to form an impregnated fiber reinforcement.

In step (i) of the immediately preceding method of impregnating a fiber reinforcement, a composition comprising a thermoplastic polymer in a fluid state is applied to a release liner to form a film. The release liner and the composition are as described and exemplified above. The composition can be applied to the release liner using conventional coating techniques, such as spin coating, dipping, spraying, brushing, extrusion, or screen-printing. The composition is applied in an amount sufficient to embed the fiber reinforcement in step (ii), below.

In step (ii), a fiber reinforcement is embedded in the film. The fiber reinforcement is as described and exemplified above. The fiber reinforcement can be embedded in the film by simply placing the reinforcement on the film and allowing the composition of the film to saturate the reinforcement.

In step (iii), the composition comprising a thermoplastic polymer in a fluid state is applied to the embedded fiber reinforcement to form an impregnated fiber reinforcement. The composition can be applied to the embedded fiber reinforcement using conventional methods, as described above for step (i).

The first method of impregnating a fiber reinforcement can further comprise the steps of (iv) applying a second release liner to the impregnated fiber reinforcement to form an assembly; and (v) compressing the assembly. Also, the first method can further comprise after step (ii) and before step (iii), degassing the embedded fiber reinforcement and/or after step (iii) and before step (iv) degassing the impregnated fiber reinforcement.

The assembly can be compressed to remove excess composition and/or entrapped air, and to reduce the thickness of the impregnated fiber reinforcement. The assembly can be compressed using conventional equipment such as a stainless steel roller, hydraulic press, rubber roller, or laminating roll set. The assembly is typically compressed at a pressure of from 1,000 Pa to 10 MPa and at a temperature of from room temperature (~23±2° C.) to 200° C.

The embedded fiber reinforcement or impregnated fiber reinforcement can be degassed by subjecting it to a vacuum at a temperature sufficient to maintain the fluid state of the thermoplastic polymer.

Alternatively, according to a second method, the fiber reinforcement can be impregnated in the composition comprising a thermoplastic polymer in a fluid state by (i) depositing a fiber reinforcement on a release liner; (ii) embedding the fiber reinforcement in a composition comprising a thermoplastic polymer in a fluid state; (iii) applying the composition to the embedded fiber reinforcement to form an impregnated fiber reinforcement. The second method can further comprise the steps of (iv) applying a second release liner to the impregnated fiber reinforcement to form an assembly; and (v) compressing the assembly. In the second method, steps (iii) to (v) are as described above for the first method of impregnating a fiber reinforcement in a composition comprising a thermoplastic polymer in a fluid state. Also, the second method can further comprise after step (ii) and before step (iii), degassing the embedded fiber reinforcement and/or after step (iii) and before step (iv) degassing the impregnated fiber reinforcement.

In step (ii) of the immediately preceding method of impregnating a fiber reinforcement, a fiber reinforcement is embedded in a composition comprising a thermoplastic polymer in a fluid state. The reinforcement can be embedded in the composition by simply covering the reinforcement with the composition and allowing the composition to saturate the reinforcement.

Furthermore, when the fiber reinforcement is a woven or nonwoven fabric, the reinforcement can be impregnated in a composition comprising a thermoplastic polymer in a fluid state by passing it through the composition. The fabric is typically passed through the composition at a rate of from 1 to 1,000 cm/s.

In step (b) of the preceding method of forming the first polymer layer, the thermoplastic polymer of the impregnated fiber reinforcement is converted to a solid state. When the composition used to coat the release liner comprises a thermoplastic polymer in a molten state, the thermoplastic polymer can be converted to a solid state by allowing the polymer to cool to a temperature below the liquid-solid transition temperature ($T_g$ or $T_m$), for example, room temperature. When the composition used to coat the release liner comprises a thermoplastic polymer and an organic solvent, the thermoplastic polymer can be converted to a solid state by removing at least a portion of the solvent. The organic solvent can be removed by allowing the solvent to evaporate at ambient temperature or by heating the coating to a moderate temperature, for example, below the solid-liquid transition temperature of the polymer.

The method of forming the first polymer layer, wherein the layer contains a composition comprising a thermoplastic resin in fluid state and a fiber reinforcement, can further comprise repeating the steps (a) and (b) to increase the thickness of the polymer layer, provided the same composition is used for each impregnation.

When the first polymer layer comprises a thermoset polymer and a fiber reinforcement, the polymer layer can be formed by (a') impregnating a fiber reinforcement in a curable composition comprising a thermosetting polymer; and (b') curing the thermosetting polymer of the impregnated fiber reinforcement.

In step (a') of the immediately preceding method of forming the first polymer layer, a fiber reinforcement is impregnated in a curable composition comprising a thermosetting polymer. The fiber reinforcement and composition are as described and exemplified above. The fiber reinforcement can be impregnated in the curable composition using the method described above for impregnating a fiber reinforcement in a composition comprising a thermoplastic polymer.

In step (b') of the immediately preceding method of forming the first polymer layer, the thermosetting polymer of the impregnated fiber reinforcement is cured. The thermosetting polymer can be cured using a variety of methods, including, exposing the impregnated fiber reinforcement to ambient or elevated temperature, moisture, or radiation, depending on the type of curable composition used to impregnate the fiber reinforcement.

For example, when the curable composition used to impregnate the fiber reinforcement is a hydrosilylation-curable silicone composition comprising at least one silicone resin having an average of at least two silicon-bonded alkenyl groups or silicon-bonded hydrogen atoms per molecule, the silicone resin can be cured by heating the impregnated fiber reinforcement at atmospheric, subatmospheric, or supraatmospheric pressure. The impregnated fiber reinforcement is typically heated at a temperature of from room temperature (~23±2° C.) to 250° C., alternatively from room temperature to 200° C., alternatively from room temperature to 150° C., at atmospheric pressure. The reinforcement is heated for a length of time sufficient to cure (cross-link) the silicone resin. For example, the impregnated fiber reinforcement is typically heated at a temperature of from 150 to 200° C. for a time of from 0.1 to 3 h.

Alternatively, when the curable composition used to impregnate the fiber reinforcement is a hydrosilylation-curable silicone composition comprising at least one silicone resin having an average of at least two silicon-bonded alkenyl groups or silicon-bonded hydrogen atoms per molecule, the silicone resin can be cured by heating the impregnated fiber reinforcement in a vacuum at a temperature of from 100 to 200° C. and a pressure of from 1,000 to 20,000 Pa for a time of from 0.5 to 3 h. The impregnated fiber reinforcement can be heated in a vacuum using a conventional vacuum bagging process. In a typically process, a bleeder (e.g., polyester) is applied over the impregnated fiber reinforcement, a breather (e.g, Nylon, polyester) is applied over the bleeder, a vacuum bagging film (e.g., Nylon) equipped with a vacuum nozzle is applied over the breather, the assembly is sealed with tape, a vacuum (e.g., 1,000 Pa) is applied to the sealed assembly, and the evacuated bag is heated as described above.

The method of preparing the first polymer layer, wherein the layer comprises a thermoset polymer and a fiber reinforcement, can further comprise repeating the steps (a') and (b') to increase the thickness of the polymer layer, provided the same curable composition is used for each impregnation.

In the second step of the method of preparing the first reinforced silicone resin film, a second polymer layer, described above, is formed on the first polymer layer. The second polymer layer can be formed as described above in the method of forming the first polymer layer, except the second polymer layer is formed on the first polymer layer rather than the release liner.

The method of preparing the first reinforced silicone resin film can further comprise separating the first polymer layer from the release liner(s). The first polymer layer can be separated from the release liner(s) either before or after the second polymer layer is formed. Moreover, the first polymer layer can be separated from the release liner by mechanically peeling the layer away from the release liner.

A second reinforced silicone resin film according the present invention comprises:
a first polymer layer;
a second polymer layer on the first polymer layer; and
at least one additional polymer layer on at least one of the first and second polymer layers; wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial.

The first polymer layer of the second reinforced silicone resin film typically has a thickness of from 0.01 to 1000 µm, alternatively from 5 to 500 µm, alternatively from 10 to 100 µm.

The first polymer layer of the second reinforced silicone resin film can comprise a thermoplastic or thermoset polymer. The thermoplastic and thermoset polymers are as described and exemplified above for the first reinforced silicone resin film.

In addition to a thermoplastic or thermoset polymer, the first polymer layer of the second reinforced silicone resin film can comprise a reinforcement selected from a carbon nanomaterial, a fiber reinforcement, or a mixture thereof, each as described and exemplified above.

The second polymer layer and the additional polymer layer(s) of the second reinforced silicone resin film are as described and exemplified above for the first polymer layer. Adjacent layers of the second reinforced silicone resin film differ in at least one of numerous physical and chemical properties, including thickness, polymer composition, crosslink density, concentration of carbon nanomaterial, or concentration of an additional ingredient.

The second reinforced silicone resin film typically comprises from 1 to 100 additional polymer layers, alternatively from 1 to 10 additional polymer layers, alternatively from 2 to 5 additional polymer layers.

At least one of the polymer layers of the second reinforced silicone resin film comprises a cured product of at least one silicone resin having an average of at least two silicon-bonded alkenyl groups or silicon-bonded hydrogen atoms per molecule. The silicone resin, methods of preparing the resin, and methods of preparing the cured product of the silicone resin are as described above in the method of preparing the first reinforced silicone resin film of the present invention.

At least one of the polymer layers of the second reinforced silicone resin film comprises a carbon nanomaterial. The carbon nanomaterial, concentration of carbon nanomaterial, and method of preparing the carbon nanomaterial are as described and exemplified above for the first reinforced silicone resin film.

The first polymer layer, second polymer layer, and additional polymer layer(s) can be prepared as described below in the method of preparing the second reinforced silicone resin film of the present invention.

The second reinforced silicone resin film can be prepared by a method comprising:
forming a first polymer layer on a release liner;
forming a second polymer layer on the first polymer layer; and
forming at least one additional polymer layer on at least one of the first and second polymer layers; wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial.

The first polymer layer, the second polymer layer, and the additional polymer layer(s) can be formed as described above in the method of preparing the first reinforced silicone resin film.

The reinforced silicone resin films of the present invention typically comprise from 1 to 99% (w/w), alternatively from 1 to 95% (w/w), alternatively from 30 to 95% (w/w), alternatively from 50 to 95% (w/w), of the cured silicone resin. Also, the reinforced silicone resin films typically have a thickness of from 1 to 3000 µm, alternatively from 15 to 500 µm, alternatively from 15 to 300 µm, alternatively from 20 to 150 µm, alternatively from 30 to 125 µm.

The reinforced silicone resin films typically have a flexibility such that the films can be bent over a cylindrical steel mandrel having a diameter less than or equal to 3.2 mm without cracking, where the flexibility is determined as described in ASTM Standard D522-93a, Method B.

The reinforced silicone resin films have low coefficient of linear thermal expansion (CTE), high tensile strength, high modulus, and high resistance to thermally induced cracking. For example the film typically have a CTE of from 0 to 80 µm/m° C., alternatively from 0 to 20 µm/m° C., alternatively from 2 to 10 µm/m° C., at temperature of from room temperature (~23±2° C.) to 200° C. Also, the films typically have a tensile strength at 25° C. of from 5 to 200 MPa, alternatively from 20 to 200 MPa, alternatively from 50 to 200 MPa. Further, the reinforced silicone resin films typically have a Young's modulus at 25° C. of from 0.5 to 10 GPa, alternatively from 1 to 6 GPa, alternatively from 3 to 5 GPa.

The transparency of the reinforced silicone resin films depend on a number of factors, such as the composition of the cured silicone resin, the thickness of the film, and the type and concentration of the reinforcement. The reinforced silicone resin films typically have a transparency (% transmittance) of at least 5%, alternatively at least 10%, alternatively at least 15%, alternatively at least 20%, in the visible region of the electromagnetic spectrum.

The reinforced silicone resin films of the present invention have low coefficient of thermal expansion, and exhibit high resistance to thermally induced cracking.

The reinforced silicone resin films of the present invention are useful in applications requiring films having high thermal stability, flexibility, mechanical strength, and transparency. For example, the silicone resin films can be used as integral components of flexible displays, solar cells, flexible electronic boards, touch screens, fire-resistant wallpaper, and impact-resistant windows. The films are also suitable substrates for transparent or nontransparent electrodes.

EXAMPLES

The following examples are presented to better illustrate the reinforced silicone resin films and methods of the present invention, but are not to be considered as limiting the invention, which is delineated in the appended claims. Unless otherwise noted, all parts and percentages reported in the examples are by weight. The following methods and materials were employed in the examples:

Measurement of Mechanical Properties

Young's modulus, tensile strength, and tensile strain at break were measured using an MTS Alliance RT/5 testing frame, equipped with a 100-N load cell. Young's modulus, tensile strength, and tensile strain were determined at room temperature (~23±2° C.) for the test specimens of Examples 6 and 7.

The test specimen was loaded into two pneumatic grips spaced apart 25 mm and pulled at a crosshead speed of 1 mm/min. Load and displacement data were continuously collected. The steepest slope in the initial section of the load-displacement curve was taken as the Young's modulus. Reported values for Young's modulus (MPa), tensile strength (MPa), and tensile strain (%) each represent the average of three measurements made on different dumbbell-shaped test specimens from the same silicone resin film.

The highest point on the load-displacement curve was used to calculate the tensile strength according to the equation:

$$\sigma = F/(wb),$$

where:
$\sigma$=tensile strength, MPa,
F=highest force, N,
w=width of the test specimen, mm, and
b=thickness of the test specimen, mm.

The tensile strain at break was approximated by dividing the difference in grip separation before and after testing by the initial separation according to the equation:

$$\epsilon = 100(l_2 - l_1)/l_1,$$

where:
$\epsilon$=tensile strain at break, %,
$l_2$=final separation of the grips, mm, and
$l_1$=initial separation of the grips, mm.

Pyrograf®-III grade HHT-19 carbon nanofiber, sold by Pyrograf Products, Inc. (Cedarville, Ohio), is a heat-treated (up to 3000° C.) carbon nanofiber having a diameter of 100 to 200 nm and a length of 30,000 to 100,000 nm.

Silicone Base A: a mixture containing 82% of a silicone resin having the formula $(PhSiO_{3/2})_{0.75}(ViMe_2SiO_{1/2})_{0.25}$, where the resin has a weight-average molecular weight of about 1700, a number-average molecular weight of about 1440, and contains about 1 mol % of silicon-bonded hydroxy groups; and 18% of 1,-4-bis(dimethylsilyl)benzene. The mole ratio of silicon-bonded hydrogen atoms in the 1,-4-bis (dimethylsilyl)benzene to silicon-bonded vinyl groups in the silicone resin is 1.1:1, as determined by $^{29}$SiNMR and $^{13}$CNMR.

Silicone Base B: a mixture containing 76% of a silicone resin having the formula $(PhSiO_{3/2})_{0.75}(ViMe_2SiO_{1/2})_{0.25}$, where the resin has a weight-average molecular weight of about 1700, a number-average molecular weight of about 1440, and contains about 1 mol % of silicon-bonded hydroxy groups; 9.5% of phenyltris(dimethylsiloxy)silane; and 14.5% of 1,1,5,5-tetramethyl-3,3-diphenyltrisiloxane. The mole ratios of silicon-bonded hydrogen atoms in the phenyltris (dimethylsiloxy)silane to silicon-bonded vinyl groups in the Silicone Resin, and silicon-bonded hydrogen atoms in the 1,1,5,5-tetramethyl-3,3-diphenyltrisiloxane to silicon-bonded vinyl groups are each 0.55:1, as determined by $^{29}$SiNMR and $^{13}$CNMR.

SDC MP101 Crystal Coat Resin, which is sold by SDC Technologies, Inc. (Anaheim, Calif.) is a solution containing 31% (w/w) of a silicone resin consisting essentially of $MeSiO_{3/2}$ units and $SiO_{4/2}$ units in a mixture of methanol, 2-propanol, water, and acetic acid (~1-2%).

Melinex® 516, sold by Dupont Teijin Films (Hopewell, Va.), is a polyethylene-terephthalate (PET) film pretreated on one side with a release agent for slip and having a thickness of 125 μm.

Glass Fabric is a heat-treated glass fabric prepared by heating style 106 electrical glass fabric having a plain weave and a thickness of 37.5 μm at 575° C. for 6 h. The untreated glass fabric was obtained from JPS Glass (Slater, S.C.).

Example 1

This example demonstrates the preparation of a chemically oxidized carbon nanofiber. Pyrograf®-III carbon nanofiber (2.0 g), 12.5 mL of concentrated nitric acid, and 37.5 mL of concentrated sulfuric acid were combined sequentially in a 500-mL three-neck flask equipped with a condenser, thermometer, Teflon-coated magnetic stirring bar, and a temperature controller. The mixture was heated to 80° C. and kept at this temperature for 3 h. The mixture was then cooled by placing the flask on a layer of dry ice in a one gallon pail. The mixture was poured into a Buchner funnel containing a nylon membrane (0.8 μm) and the carbon nanofibers were collected by vacuum filtration. The nanofibers remaining on the membrane were washed several times with deionized water until the pH of the filtrate was equal to the pH of the wash water. After the last wash, the carbon nanofibers were kept in the funnel for an additional 15 min. with continued application of the vacuum. Then the nanofibers, supported on the filter membrane, were placed in an oven at 100° C. for 1 h. The carbon nanofibers were removed from filter membrane and stored in a dry sealed glass jar.

Example 2

The oxidized carbon nanofiber of Example 1 (0.1 g) was mixed with Silicone Base A (9.9 g) in a glass vial, followed by the addition of 4.0 g of heptane. The vial was placed in an ultrasonic bath for 115 min. The mixture was then subjected to centrifugation at 1500 rpm for 30 min. The supernatant was transferred to a clean vial and kept under vacuum (45 mm Hg) at 50° C. for 90 min. to remove most of the heptane.

Example 3

The oxidized carbon nanofiber of Example 1 (0.04 g) was mixed with Silicone Base B (20.0 g) in a glass vial, followed by the addition of 8.0 g of heptane. The vial was placed in an ultrasonic bath for 115 min. The mixture was then subjected to centrifugation at 1500 rpm for 30 min. The supernatant was transferred to a clean vial and kept under vacuum (45 mm Hg) at 50° C. for 90 min. to remove most of the heptane.

Example 4

The silicone composition of Example 2 (4.0 g) was mixed with 0.05 g of a catalyst consisting of a platinum(0) complex of 1,3-divinyl-1,1,3,3,-tetramethyldisiloxane in toluene, and containing 1000 ppm of platinum. The resulting composition (2.0 g) was applied on the release agent-treated surface of a Melinex® 516 PET film (8 in.×11 in.). Glass fabric having the same dimensions as the PET film was carefully laid down on the silicone film, allowing sufficient time for the composition to thoroughly wet the fabric. The silicone composition of Example 2 was then uniformly applied to the embedded fabric. An identical PET film was placed on top of the coating with the release agent-treated side in contact with the silicone composition. The stack was then passed between two stainless steel bars separated by a distance of 300 μm. The laminate was heated in an oven according to the following cycle: room temperature to 80° C. at 2° C./min., 80° C. for 30 min.; 80° C. to 160° C. at 2° C./minute, 160° C. for 60 min; 160° C. to 200° C. at 2° C./min., 200° C. for 60 min. The oven was turned off and the laminate was allowed to cool to room temperature inside the oven. The upper PET film was separated (peeled away) from the reinforced silicone resin film, and the silicone resin film was then separated from the lower PET film.

Example 5

A reinforced silicone resin film was prepared according to the method of Example 4, except the silicone composition of Example 3 was substituted for the silicone composition of Example 2.

Example 6

A reinforced silicone resin prepared according to the method of Example 4 was passed through a silicone composition prepared by diluting MP101 Crystal Coat Resin with an equal volume of 1-butanol, at a rate of about 5 cm/s. The coated film was hung vertically to dry in a fume hood at room temperature, and then cured in an air-circulating oven according to the following cycle: room temperature to 75° C. at 1° C./min., 75° C. for 1 h; 75° C. to 100° C. at 1° C./min., 100° C. for 1 h; 100° C. to 125° C. at 1° C./min., 125° C. for 1 h. The three-layer reinforced silicone resin film contains a central layer having a thickness of about 40 μm, and two outer layers each having a thickness of about 1.5 μm. The mechanical properties of the reinforced silicone resin film are shown in Table 1.

Example 7

A reinforced silicone resin prepared according to the method of Example 5 was passed through a silicone composition prepared by diluting MP101 Crystal Coat Resin with an equal volume of 1-butanol, at a rate of about 5 cm/s. The coated film was hung vertically to dry in a fume hood at room temperature, and then cured in an air-circulating oven according to the following cycle: room temperature to 75° C. at 1° C./min., 75° C. for 1 h; 75° C. to 100° C. at 1° C./min., 100° C. for 1 h; 100° C. to 125° C. at 1° C./min., 125° C. for 1 h. The three-layer reinforced silicone resin film contains a central layer having a thickness of about 40 μm, and two outer layers each having a thickness of about 1.5 μm. The mechanical properties of the reinforced silicone resin film are shown in Table 1.

TABLE 1

| Ex. | Thickness (mm) | Tensile Strength (MPa) | Young's Modulus (MPa) | Tensile Strain at Break (%) |
|---|---|---|---|---|
| 6 | 0.065 | 53.8 ± 4.0 | 2.57 ± 0.34 | 2.5 ± 0.2 |
| 7 | 0.050 | 128.5 ± 16.9 | 4.81 ± 0.48 | 3.1 ± 0.2 |

That which is claimed is:

1. A reinforced silicone resin film consisting essentially of:
a first polymer layer; and
a second polymer layer on the first polymer layer; wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial, provided when both of the polymer layers comprise a cured product of a silicone resin, then both of the polymer layers comprise a reinforcement selected from (i) a carbon nanomaterial, (ii) a fiber reinforcement, or (iii) a mixture comprising (i) and (ii).

2. The reinforced silicone resin film according to claim 1, wherein the first polymer layer and the second polymer layer each have a thickness of from 0.01 to 1000 μm.

3. The reinforced silicone resin film according to claim 1, wherein at least one of the first polymer layer and the second polymer layer comprises a reinforcement selected from a carbon nanomaterial, a fiber reinforcement, or a mixture thereof.

4. The reinforced silicone resin film according to claim 1, wherein the silicone resin has the formula $(R^1R^2_2SiO_{1/2})_w(R^2_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded alkenyl groups per molecule.

5. The reinforced silicone resin film according to claim 1, wherein the silicone resin has the formula $(R^1R^5_2SiO_{1/2})_w(R^5_2SiO_{2/2})_x(R^5SiO_{3/2})_y(SiO_{4/2})_z$ (III), wherein $R^1$ is $C_1$ to $C_{10}$ hydrocarbyl or $C_1$ to $C_{10}$ halogen-substituted hydrocarbyl, both free of aliphatic unsaturation, $R^5$ is $R^1$ or —H, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded hydrogen atoms per molecule.

6. The reinforced silicone resin film according to claim 1, wherein the silicone resin is a rubber-modified silicone resin prepared by reacting a silicone resin having the formula $(R^1R^2_2SiO_{1/2})_w(R^2_2SiO_{2/2})_x(R^2SiO_{3/2})_y(SiO_{4/2})_z$ (I) and a silicone rubber having the formula $R^5R^1_2SiO(R^1R^5SiO)_cSiR^1_2R^5$ (VI) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript c has a value of from greater than 4 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (I) has an average of at least two silicon-bonded alkenyl groups per molecule, the silicone rubber(VI) has an average of at least two silicon-bonded hydrogen atoms per molecule, and the mole ratio of silicon-bonded hydrogen atoms in the silicone rubber (VI) to silicon-bonded alkenyl groups in silicone resin (I) is from 0.01 to 0.5.

7. The reinforced silicone resin film according to claim 1, wherein the silicone resin is a rubber-modified silicone resin prepared by reacting a silicone resin having the formula $(R^1R^5_2SiO_{1/2})_w(R^5_2SiO_{2/2})_x(R^5SiO_{3/2})_y(SiO_{4/2})_z$ (III) and a silicone rubber having the formula $R^1R^2_2SiO(R^2_2SiO)_dSiR^2_2R^1$ (VII) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript d has a value of from greater than 4 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin(III) has an average of at least two silicon-bonded hydrogen atoms per molecule, the silicone rubber (VII) has an average of at least two silicon-bonded alkenyl groups per molecule, and the mole ratio of silicon-bonded alkenyl groups in the silicone rubber (VII) to silicon-bonded hydrogen atoms in the silicone resin (III) is from 0.01 to 0.5.

8. The reinforced silicone resin film according to claim 1, wherein at least one of the polymer layers comprises a carbon nanomaterial selected from carbon nanoparticles, fibrous carbon nanomaterials, or layered carbon nano materials.

9. A reinforced silicone resin film comprising:
a first polymer layer;
a second polymer layer on the first polymer layer; and
at least one additional polymer layer on at least one of the first or second polymer layers; wherein at least one of the polymer layers comprises a cured product of at least one silicone resin having an average of at least two silicon-bonded alkenyl groups or silicon-bonded hydrogen atoms per molecule, and at least one of the polymer layers comprises a carbon nanomaterial.

10. The reinforced silicone resin film according to claim 9, wherein the first polymer layer, the second polymer layer, and the additional polymer layer each have a thickness of from 0.01 to 1000 μm.

11. The reinforced silicone resin film according to claim 9, wherein at least one of the polymer layers comprises a reinforcement selected from a carbon nanomaterial, a fiber reinforcement, or a mixture thereof.

12. The reinforced silicone resin film according to claim 9, wherein the silicone resin has the formula $(R^1R^2{}_2SiO_{1/2})_w(R^2{}_2SiO_{2/2})_x(R^2SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded alkenyl groups per molecule.

13. The reinforced silicone resin film according to claim 9, wherein the silicone resin has the formula $(R^1R^5{}_2SiO_{1/2})_w(R^5{}_2SiO_{2/2})_x(R^5SiO_{3/2})_y(SiO_{4/2})_z$ (III), wherein $R^1$ is $C_1$ to $C_{10}$ hydrocarbyl or $C_1$ to $C_{10}$ halogen-substituted hydrocarbyl, both free of aliphatic unsaturation, $R^5$ is $R^1$ or —H, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin has an average of at least two silicon-bonded hydrogen atoms per molecule.

14. The reinforced silicone resin film according to claim 9, wherein the silicone resin is a rubber-modified silicone resin prepared by reacting a silicone resin having the formula $(R^1R^2{}_2SiO_{1/2})_w(R^2{}_2SiO_{2/2})_x(R^2SiO_{3/2})_y(SiO_{4/2})_z$ (I) and a silicone rubber having the formula $R^5R^1{}_2SiO(R^1R^5SiO)_cSiR^1{}_2R^5$ (VI) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript c has a value of from greater than 4 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (I) has an average of at least two silicon-bonded alkenyl groups per molecule, the silicone rubber (VI) has an average of at least two silicon-bonded hydrogen atoms per molecule, and the mole ratio of silicon-bonded hydrogen atoms in the silicone rubber (VI) to silicon-bonded alkenyl groups in silicone resin (I) is from 0.01 to 0.5.

15. The reinforced silicone resin film according to claim 9, wherein the silicone resin is a rubber-modified silicone resin prepared by reacting a silicone resin having the formula $(R^1R^5{}_2SiO_{1/2})_w(R^5{}_2SiO_{2/2})_x(R^5SiO_{3/2})_y(SiO_{4/2})_z$ (III) and a silicone rubber having the formula $R^1R^2{}_2SiO(R^2{}_2SiO)_dSiR^2{}_2R^1$ (VII) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript d has a value of from greater than 4 to 1,000, w is from 0 to 0.95, x is from 0 to 0.95, y is from 0 to 1, z is from 0 to 0.95, w+x+y+z=1, y+z is from 0.05 to 1, and w+x is from 0 to 0.95, provided the silicone resin (III) has an average of at least two silicon-bonded hydrogen atoms per molecule, the silicone rubber (VII) has an average of at least two silicon-bonded alkenyl groups per molecule, and the mole ratio of silicon-bonded alkenyl groups in the silicone rubber (VII) to silicon-bonded hydrogen atoms in the silicone resin (III) is from 0.01 to 0.5.

16. The reinforced silicone resin film according to claim 9, wherein at least one of the polymer layers comprises a carbon nanomaterial selected from carbon nanoparticles, fibrous carbon nanomaterials, and layered carbon nanomaterials.

* * * * *